United States Patent
Mishra et al.

(10) Patent No.: US 11,966,268 B2
(45) Date of Patent: Apr. 23, 2024

(54) APPARATUS AND METHODS FOR THERMAL MANAGEMENT OF ELECTRONIC USER DEVICES BASED ON USER ACTIVITY

(71) Applicant: Intel Corporation, Santa Clara, CA (US)

(72) Inventors: Columbia Mishra, Hillsboro, OR (US); Carin Ruiz, Portland, OR (US); Helin Cao, Portland, OR (US); Soethiha Soe, Beaverton, OR (US); James Hermerding, II, Vancouver, WA (US); Bijendra Singh, Bangalore (IN); Navneet Singh, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/732,173

(22) Filed: Apr. 28, 2022

(65) Prior Publication Data
US 2022/0350385 A1  Nov. 3, 2022

Related U.S. Application Data

(63) Continuation of application No. 16/728,774, filed on Dec. 27, 2019, now Pat. No. 11,360,528.

(51) Int. Cl.
*G06F 1/20* (2006.01)
*G06F 1/32* (2019.01)
(Continued)

(52) U.S. Cl.
CPC ............ *G06F 1/206* (2013.01); *G06F 1/32* (2013.01); *G06F 3/013* (2013.01); *G06V 10/774* (2022.01);
(Continued)

(58) Field of Classification Search
CPC ........................................................ G06F 1/206
See application file for complete search history.

(56) References Cited

U.S. PATENT DOCUMENTS

| D324,036 S | 2/1992 | Wakasa |
|---|---|---|
| 5,173,940 A | 12/1992 | Lantz et al. |

(Continued)

FOREIGN PATENT DOCUMENTS

| CN | 102197349 | 9/2011 |
|---|---|---|
| CN | 102231255 | 11/2011 |

(Continued)

OTHER PUBLICATIONS

"Dell's New Latitude 7400 2-in-1 Can Detect Your Presence and Automatically Wake the System," MSPowerUser, Jan. 4, 2019, available at https://mspoweruser.com/dells-new-latitude-7400-2-in-1-can-detect-your-presence-and-automatically-wake-the-system/ (20 pages).

(Continued)

*Primary Examiner* — Suresh Suryawanshi
(74) *Attorney, Agent, or Firm* — Hanley, Flight & Zimmerman, LLC

(57) ABSTRACT

Apparatus and methods for thermal management of electronic user devices are disclosed herein. An example apparatus includes at least one of a user presence detection analyzer to identify a presence of a user relative to an electronic device based on first sensor data generated by a first sensor or at least one of an image data analyzer or a motion data analyzer to determine a gesture of the user relative to the device based on second sensor data generated by a second sensor; a thermal constraint selector to select a thermal constraint for a temperature of an exterior surface of the electronic device based on one or more of the presence of the user or the gesture; and a power source manager to (Continued)

adjust a power level for a processor of the electronic device based on the thermal constraint.

20 Claims, 9 Drawing Sheets

(51) Int. Cl.
| | |
|---|---|
| G06F 3/01 | (2006.01) |
| G06V 10/774 | (2022.01) |
| G06V 40/10 | (2022.01) |
| G06V 40/16 | (2022.01) |
| G10L 25/51 | (2013.01) |
| H04B 1/3827 | (2015.01) |

(52) U.S. Cl.
CPC ............ *G06V 40/10* (2022.01); *G06V 40/165* (2022.01); *G10L 25/51* (2013.01); *H04B 1/3827* (2013.01); *G06F 2200/201* (2013.01)

(56) References Cited

U.S. PATENT DOCUMENTS

| | | |
|---|---|---|
| D359,275 S | 6/1995 | Yamazaki |
| D376,791 S | 12/1996 | Schreiner |
| D388,774 S | 1/1998 | Guintoli |
| D389,129 S | 1/1998 | Guintoli |
| 5,835,083 A | 11/1998 | Nielsen et al. |
| D433,024 S | 10/2000 | Oross |
| D434,773 S | 12/2000 | Suzuki |
| D444,462 S | 7/2001 | Tsuji |
| D449,307 S | 10/2001 | Amano |
| D453,508 S | 2/2002 | Shibata |
| D454,126 S | 3/2002 | Bliven et al. |
| D462,967 S | 9/2002 | Suzuki |
| 6,591,198 B1 | 7/2003 | Pratt |
| D478,089 S | 8/2003 | Yokota |
| D480,089 S | 9/2003 | Skinner et al. |
| 6,657,647 B1 | 12/2003 | Bright |
| 6,760,649 B2 | 7/2004 | Cohen |
| D494,161 S | 8/2004 | Sawaquchi |
| D504,129 S | 4/2005 | Loew et al. |
| D517,542 S | 3/2006 | Lee et al. |
| D518,042 S | 3/2006 | Kanayama |
| D534,531 S | 1/2007 | Ogasawara |
| 7,386,799 B1 | 6/2008 | Clanton et al. |
| D577,013 S | 9/2008 | Harris |
| D591,737 S | 5/2009 | Morooka |
| 7,559,034 B1 | 7/2009 | Paperny et al. |
| D607,449 S | 1/2010 | Morisawa |
| D608,380 S | 1/2010 | Nagase et al. |
| D611,043 S | 3/2010 | Andre et al. |
| D611,045 S | 3/2010 | Andre et al. |
| D612,830 S | 3/2010 | Kim et al. |
| D614,180 S | 4/2010 | Gou |
| D616,433 S | 5/2010 | Morishita et al. |
| 7,725,547 B2 | 5/2010 | Albertson et al. |
| D616,882 S | 6/2010 | Denhez |
| D631,039 S | 1/2011 | Sakai et al. |
| 7,971,156 B2 | 6/2011 | Albertson et al. |
| 7,974,743 B2 | 7/2011 | Nakashima et al. |
| D645,857 S | 9/2011 | Cho et al. |
| 8,139,032 B2 | 3/2012 | Su et al. |
| D659,134 S | 5/2012 | Ahn et al. |
| D672,765 S | 12/2012 | Masui |
| D673,558 S | 1/2013 | Cruz et al. |
| D674,382 S | 1/2013 | Andre et al. |
| D684,570 S | 6/2013 | Akana et al. |
| D687,831 S | 8/2013 | Kim |
| 8,566,696 B1 | 10/2013 | Hamon et al. |
| D692,875 S | 11/2013 | Lawrence |
| 8,581,974 B2 | 11/2013 | Lin et al. |
| D698,348 S | 1/2014 | Ilchan et al. |
| D704,185 S | 5/2014 | Bowers et al. |
| 8,717,318 B2 | 5/2014 | Anderson et al. |
| D706,767 S | 6/2014 | Kawai et al. |
| D706,768 S | 6/2014 | Kawai |
| D706,769 S | 6/2014 | Kawai et al. |
| D706,772 S | 6/2014 | Koyama et al. |
| D708,178 S | 7/2014 | Honda et al. |
| D708,179 S | 7/2014 | Andre et al. |
| D709,491 S | 7/2014 | Kurimoto et al. |
| 8,812,831 B2 | 8/2014 | Cheng et al. |
| D712,971 S | 9/2014 | Huang |
| D715,793 S | 10/2014 | Tsao et al. |
| D716,795 S | 11/2014 | Huang et al. |
| D718,818 S | 12/2014 | Sumii et al. |
| D720,712 S | 1/2015 | Park et al. |
| 8,954,884 B1 | 2/2015 | Barger |
| D724,576 S | 3/2015 | Wolff et al. |
| 8,994,847 B2 | 3/2015 | Chen et al. |
| D727,314 S | 4/2015 | Fukuoka |
| D729,227 S | 5/2015 | Fukuoka |
| D729,228 S | 5/2015 | Kawai |
| D729,229 S | 5/2015 | Kurimoto et al. |
| D729,791 S | 5/2015 | Adamson et al. |
| D729,792 S | 5/2015 | Kurimoto et al. |
| D731,475 S | 6/2015 | Mehandjiysky et al. |
| D739,398 S | 9/2015 | Adamson et al. |
| D739,399 S | 9/2015 | Adamson et al. |
| D739,400 S | 9/2015 | Adamson et al. |
| D740,278 S | 10/2015 | Bowers et al. |
| D741,318 S | 10/2015 | Oakley |
| 9,183,845 B1 | 11/2015 | Gopalakrishnan et al. |
| D746,809 S | 1/2016 | Takada et al. |
| 9,268,434 B2 | 2/2016 | Sultenfuss |
| D751,062 S | 3/2016 | Chang |
| 9,311,909 B2 | 4/2016 | Giaimo, III et al. |
| 9,436,241 B2 | 9/2016 | Tang et al. |
| D769,251 S | 10/2016 | Chen |
| D771,684 S | 11/2016 | Kim |
| D780,173 S | 2/2017 | Matsuoka |
| 9,575,559 B2 | 2/2017 | Andrysco |
| D780,760 S | 3/2017 | Ironmonger et al. |
| D788,767 S | 6/2017 | Magi |
| D794,027 S | 8/2017 | Ironmonger et al. |
| 9,721,383 B1 | 8/2017 | Horowitz et al. |
| 9,740,290 B2 | 8/2017 | Rosenberg et al. |
| 9,766,700 B2 | 9/2017 | Lyons et al. |
| 9,785,234 B2 | 10/2017 | Horesh |
| D801,945 S | 11/2017 | Cho et al. |
| D803,946 S | 11/2017 | Matsuda |
| 9,846,471 B1 | 12/2017 | Arora |
| D810,069 S | 2/2018 | Hishiki |
| D810,071 S | 2/2018 | Hishiki |
| D813,235 S | 3/2018 | Rosenberg et al. |
| D814,469 S | 4/2018 | Rundberg |
| D816,083 S | 4/2018 | Wu |
| 9,936,195 B2 | 4/2018 | Horesh |
| 9,996,638 B1 | 6/2018 | Holz et al. |
| D823,850 S | 7/2018 | Lim et al. |
| 10,027,662 B1 | 7/2018 | Mutagi et al. |
| D825,435 S | 8/2018 | Yu |
| 10,101,817 B2 | 10/2018 | Hsin et al. |
| 10,234,928 B2 | 3/2019 | Chen |
| 10,254,178 B2 | 4/2019 | Carbone et al. |
| 10,262,599 B2 | 4/2019 | Lang et al. |
| 10,304,209 B2 | 5/2019 | Alonso |
| 10,415,286 B1 | 9/2019 | Porcella et al. |
| D867,460 S | 11/2019 | Yan et al. |
| D873,835 S | 1/2020 | Chan |
| 10,551,888 B1 | 2/2020 | North et al. |
| D878,475 S | 3/2020 | Jetter |
| D879,777 S | 3/2020 | Cho |
| 10,620,457 B2 | 4/2020 | Ain-Kedem |
| 10,620,786 B2 | 4/2020 | Veeramani et al. |
| D886,112 S | 6/2020 | Yeh et al. |
| 10,725,510 B2 | 7/2020 | Ho et al. |
| 10,740,912 B2 | 8/2020 | Ren et al. |
| 10,768,724 B1 | 9/2020 | Han |
| 10,819,920 B1 | 10/2020 | Hamlin et al. |
| 10,884,479 B2 | 1/2021 | Chen |
| D914,010 S | 3/2021 | Yeh et al. |
| D914,021 S | 3/2021 | Magi et al. |

(56) References Cited

U.S. PATENT DOCUMENTS

| | | | |
|---|---|---|---|
| D916,076 S | 4/2021 | Seoc et al. | |
| D916,078 S | 4/2021 | Akana et al. | |
| 11,153,472 B2 | 10/2021 | Konicek | |
| D934,856 S | 11/2021 | Yeh et al. | |
| 11,194,398 B2 | 12/2021 | Bernhart | |
| 11,360,528 B2 | 6/2022 | Mishra et al. | |
| 11,379,016 B2 | 7/2022 | Cooper et al. | |
| 11,543,873 B2 | 1/2023 | Sengupta et al. | |
| D982,575 S | 4/2023 | Bae et al. | |
| 11,733,761 B2 | 8/2023 | Sinah et al. | |
| 2002/0089190 A1 | 7/2002 | Wang et al. | |
| 2002/0091738 A1 | 7/2002 | Rohrabaugh et al. | |
| 2003/0043174 A1 | 3/2003 | Hinckley et al. | |
| 2003/0174149 A1 | 9/2003 | Fujisaki et al. | |
| 2004/0120113 A1 | 6/2004 | Rapaich | |
| 2004/0158739 A1 | 8/2004 | Wakai et al. | |
| 2004/0175020 A1 | 9/2004 | Bradski et al. | |
| 2004/0252101 A1 | 12/2004 | Wilk | |
| 2005/0071698 A1 | 3/2005 | Kangas | |
| 2005/0094823 A1 | 5/2005 | Kobori et al. | |
| 2006/0146030 A1 | 7/2006 | Kim | |
| 2006/0192775 A1* | 8/2006 | Nicholson | G06F 3/013 345/211 |
| 2007/0027580 A1* | 2/2007 | Ligtenberg | G05D 23/19 700/300 |
| 2007/0228138 A1 | 10/2007 | Huang et al. | |
| 2008/0046425 A1 | 2/2008 | Perski | |
| 2008/0112571 A1 | 5/2008 | Bradicich et al. | |
| 2008/0158144 A1 | 7/2008 | Schobben et al. | |
| 2008/0301300 A1 | 12/2008 | Toub | |
| 2009/0092261 A1 | 4/2009 | Bard | |
| 2009/0092262 A1 | 4/2009 | Costa et al. | |
| 2009/0092293 A1 | 4/2009 | Lin | |
| 2009/0165125 A1 | 6/2009 | Brown et al. | |
| 2010/0039376 A1 | 2/2010 | Wang | |
| 2010/0079508 A1 | 4/2010 | Hodge et al. | |
| 2010/0100716 A1 | 4/2010 | Scott et al. | |
| 2010/0281432 A1 | 11/2010 | Geisner et al. | |
| 2010/0295839 A1 | 11/2010 | Nagaya et al. | |
| 2011/0035606 A1* | 2/2011 | Lovicott | G06F 1/206 713/300 |
| 2011/0055752 A1 | 3/2011 | Rubinstein et al. | |
| 2011/0154266 A1 | 6/2011 | Friend et al. | |
| 2011/0175932 A1 | 7/2011 | Yu et al. | |
| 2011/0298702 A1 | 8/2011 | Sakata et al. | |
| 2011/0248918 A1 | 10/2011 | Yoo et al. | |
| 2011/0251733 A1 | 10/2011 | Atkinson et al. | |
| 2011/0252339 A1 | 10/2011 | Lemonik et al. | |
| 2011/0273546 A1 | 11/2011 | Lin et al. | |
| 2011/0296163 A1 | 12/2011 | Abernethy et al. | |
| 2011/0298967 A1 | 12/2011 | Clavin et al. | |
| 2012/0032894 A1 | 2/2012 | Parivar et al. | |
| 2012/0054670 A1 | 3/2012 | Rainisto | |
| 2012/0062470 A1 | 3/2012 | Chang | |
| 2012/0123680 A1 | 5/2012 | Wipplinger et al. | |
| 2012/0171656 A1 | 7/2012 | Shen | |
| 2012/0172085 A1 | 7/2012 | Vuppu et al. | |
| 2012/0249429 A1 | 10/2012 | Anderson et al. | |
| 2012/0268893 A1 | 10/2012 | Yin | |
| 2012/0300061 A1 | 11/2012 | Osman et al. | |
| 2012/0319997 A1 | 12/2012 | Majumder | |
| 2013/0007096 A1 | 1/2013 | Pahlavan et al. | |
| 2013/0007590 A1 | 1/2013 | Rivera et al. | |
| 2013/0021265 A1 | 1/2013 | Selim | |
| 2013/0021750 A1* | 1/2013 | Senatori | G06F 1/3231 361/688 |
| 2013/0080807 A1 | 3/2013 | Theocharous et al. | |
| 2013/0120460 A1 | 5/2013 | Adams et al. | |
| 2013/0158999 A1 | 6/2013 | Maruta et al. | |
| 2013/0173946 A1 | 7/2013 | Rotem et al. | |
| 2013/0174016 A1 | 7/2013 | Glazer et al. | |
| 2013/0185633 A1 | 7/2013 | Bunker et al. | |
| 2013/0207895 A1 | 8/2013 | Lee et al. | |
| 2013/0212462 A1 | 8/2013 | Athas et al. | |
| 2013/0222329 A1 | 8/2013 | Larsby et al. | |
| 2013/0283213 A1 | 10/2013 | Guendelman et al. | |
| 2013/0289792 A1* | 10/2013 | Cheng | G06F 1/206 700/300 |
| 2013/0321265 A1 | 12/2013 | Bychkov et al. | |
| 2013/0321271 A1 | 12/2013 | Bychkov et al. | |
| 2013/0332760 A1 | 12/2013 | Reece et al. | |
| 2014/0006830 A1 | 1/2014 | Kamhi et al. | |
| 2014/0028548 A1 | 1/2014 | Bychkov et al. | |
| 2014/0050360 A1 | 2/2014 | Lin et al. | |
| 2014/0085451 A1 | 3/2014 | Kamimura et al. | |
| 2014/0089865 A1 | 3/2014 | Gay et al. | |
| 2014/0094973 A1 | 4/2014 | Giaimo, III et al. | |
| 2014/0129937 A1 | 5/2014 | Jarvinen et al. | |
| 2014/0132508 A1 | 5/2014 | Hodge et al. | |
| 2014/0132514 A1 | 5/2014 | Kuzara et al. | |
| 2014/0139456 A1 | 5/2014 | Wigdor et al. | |
| 2014/0149935 A1 | 5/2014 | Johnson et al. | |
| 2014/0189579 A1 | 7/2014 | Rimon et al. | |
| 2014/0191995 A1 | 7/2014 | Karpin et al. | |
| 2014/0201690 A1 | 7/2014 | Holz et al. | |
| 2014/0208260 A1 | 7/2014 | Kawahara et al. | |
| 2014/0258942 A1 | 9/2014 | Kutliroff et al. | |
| 2014/0267021 A1 | 9/2014 | Lee et al. | |
| 2014/0267034 A1 | 9/2014 | Krulce et al. | |
| 2014/0281918 A1 | 9/2014 | Wei et al. | |
| 2014/0313120 A1 | 10/2014 | Kamhi | |
| 2014/0344599 A1 | 11/2014 | Branover et al. | |
| 2014/0361977 A1 | 12/2014 | Stafford et al. | |
| 2014/0372511 A1 | 12/2014 | Kapadia et al. | |
| 2014/0380075 A1 | 12/2014 | Pulapaka et al. | |
| 2015/0009238 A1 | 1/2015 | Kudalkar | |
| 2015/0015688 A1 | 1/2015 | Yang | |
| 2015/0042572 A1 | 2/2015 | Lombardi et al. | |
| 2015/0058649 A1 | 2/2015 | Song et al. | |
| 2015/0100884 A1 | 4/2015 | Ryu et al. | |
| 2015/0121193 A1 | 4/2015 | Beveridge et al. | |
| 2015/0121287 A1 | 4/2015 | Fermon | |
| 2015/0177843 A1 | 6/2015 | Kwon | |
| 2015/0185909 A1 | 7/2015 | Gecnuk | |
| 2015/0193395 A1 | 7/2015 | Nicolaou et al. | |
| 2015/0220149 A1 | 8/2015 | Plagemann et al. | |
| 2015/0220150 A1 | 8/2015 | Plagemann et al. | |
| 2015/0248167 A1 | 9/2015 | Turbell et al. | |
| 2015/0264572 A1 | 9/2015 | Turgeman | |
| 2015/0360567 A1 | 12/2015 | Sannomiya et al. | |
| 2015/0363070 A1 | 12/2015 | Katz | |
| 2015/0378443 A1 | 12/2015 | Luo | |
| 2015/0378748 A1 | 12/2015 | Cheng et al. | |
| 2016/0013745 A1 | 1/2016 | North et al. | |
| 2016/0034019 A1 | 2/2016 | Seo et al. | |
| 2016/0062584 A1 | 3/2016 | Cohen et al. | |
| 2016/0087981 A1 | 3/2016 | Dorresteijn | |
| 2016/0109961 A1 | 4/2016 | Parshionikar | |
| 2016/0116960 A1 | 4/2016 | Kwak et al. | |
| 2016/0091938 A1 | 5/2016 | Edwards et al. | |
| 2016/0132099 A1 | 5/2016 | Grabau et al. | |
| 2016/0170617 A1 | 6/2016 | Shi et al. | |
| 2016/0179767 A1 | 6/2016 | Mavinakuli et al. | |
| 2016/0180762 A1 | 6/2016 | Bathiche et al. | |
| 2016/0187994 A1 | 6/2016 | La et al. | |
| 2016/0202750 A1 | 7/2016 | Pulapaka et al. | |
| 2016/0212317 A1 | 7/2016 | Alameh et al. | |
| 2016/0232701 A1 | 8/2016 | Drozdyuk | |
| 2016/0259467 A1 | 9/2016 | Nayyar et al. | |
| 2016/0297362 A1 | 10/2016 | Tijerina et al. | |
| 2016/0335989 A1 | 11/2016 | Ooi et al. | |
| 2016/0370860 A1 | 12/2016 | Bychkov et al. | |
| 2017/0010654 A1 | 1/2017 | Chen | |
| 2017/0018234 A1 | 1/2017 | Na et al. | |
| 2017/0028548 A1 | 2/2017 | Nagano | |
| 2017/0034146 A1 | 2/2017 | Sugya | |
| 2017/0039170 A1 | 2/2017 | Tunali et al. | |
| 2017/0045936 A1 | 2/2017 | Kakapuri | |
| 2017/0075479 A1 | 3/2017 | Tsukamoto | |
| 2017/0085790 A1 | 3/2017 | Bohn | |
| 2017/0090585 A1 | 3/2017 | Bernhart | |
| 2017/0147879 A1 | 5/2017 | Alameh et al. | |
| 2017/0201254 A1 | 7/2017 | Hanssen et al. | |
| 2017/0219240 A1 | 8/2017 | Cassini et al. | |

(56) References Cited

U.S. PATENT DOCUMENTS

| | | |
|---|---|---|
| 2017/0269725 A1 | 9/2017 | Kang |
| 2017/0321856 A1 | 9/2017 | Keates |
| 2018/0039410 A1 | 2/2018 | Kim et al. |
| 2018/0039990 A1 | 2/2018 | Lindemann |
| 2018/0136719 A1 | 5/2018 | Chen |
| 2018/0157815 A1 | 6/2018 | Salama et al. |
| 2018/0164942 A1 | 6/2018 | Huffman et al. |
| 2018/0166076 A1 | 6/2018 | Higuchi et al. |
| 2018/0188774 A1 | 7/2018 | Ent et al. |
| 2018/0188803 A1 | 7/2018 | Sharma et al. |
| 2018/0189547 A1 | 7/2018 | Daniels et al. |
| 2018/0224871 A1 | 8/2018 | Sahu et al. |
| 2018/0321731 A1 | 11/2018 | Alfano et al. |
| 2018/0373292 A1 | 12/2018 | Perelli |
| 2019/0004764 A1 | 1/2019 | Son et al. |
| 2019/0034609 A1 | 1/2019 | Yang et al. |
| 2019/0079572 A1 | 3/2019 | Yamamoto |
| 2019/0129473 A1 | 5/2019 | Hu et al. |
| 2019/0147875 A1 | 5/2019 | Stemmer et al. |
| 2019/0155364 A1 | 5/2019 | Chen |
| 2019/0155368 A1* | 5/2019 | Branover .............. G06F 1/3287 |
| 2019/0174419 A1 | 6/2019 | Schillings et al. |
| 2019/0236390 A1 | 8/2019 | Guo et al. |
| 2019/0239384 A1 | 8/2019 | North et al. |
| 2019/0250691 A1 | 8/2019 | Lee et al. |
| 2019/0258785 A1* | 8/2019 | Alameh .................. G06F 21/50 |
| 2019/0265831 A1 | 8/2019 | Sinnot et al. |
| 2019/0278339 A1 | 9/2019 | Cooper et al. |
| 2019/0361501 A1 | 11/2019 | Park et al. |
| 2019/0371326 A1 | 12/2019 | Bocklet et al. |
| 2019/0371342 A1 | 12/2019 | Tukka et al. |
| 2020/0012331 A1 | 1/2020 | De Cesare et al. |
| 2020/0026342 A1 | 1/2020 | Sengupta et al. |
| 2020/0033920 A1 | 1/2020 | Nielsen et al. |
| 2020/0134151 A1 | 1/2020 | Magi et al. |
| 2020/0092817 A1 | 3/2020 | Bai |
| 2020/0125158 A1 | 4/2020 | Giusti et al. |
| 2020/0125179 A1 | 4/2020 | Okuley |
| 2020/0133358 A1 | 4/2020 | Mishra et al. |
| 2020/0133374 A1* | 4/2020 | Sinha .................... G06F 1/3287 |
| 2020/0142471 A1 | 5/2020 | Azam et al. |
| 2020/0175944 A1 | 6/2020 | Sun et al. |
| 2020/0213501 A1 | 7/2020 | Sohn |
| 2020/0259638 A1 | 8/2020 | Carmignani et al. |
| 2020/0348745 A1 | 11/2020 | Hamlin et al. |
| 2021/0025976 A1 | 1/2021 | Chandel et al. |
| 2021/0096237 A1 | 4/2021 | Patole et al. |
| 2021/0109585 A1 | 4/2021 | Fleming et al. |
| 2021/0240254 A1 | 8/2021 | Hamlin et al. |
| 2021/0318743 A1 | 10/2021 | Partiwala et al. |
| 2021/0327394 A1 | 10/2021 | Bui et al. |
| 2022/0147142 A1 | 5/2022 | Bui et al. |
| 2022/0334620 A1 | 10/2022 | Cooper et al. |
| 2023/0205307 A1 | 6/2023 | Han et al. |

FOREIGN PATENT DOCUMENTS

| | | |
|---|---|---|
| CN | 107077184 | 8/2017 |
| CN | 112558056 | 3/2021 |
| EP | 2518586 | 10/2012 |
| EP | 3285133 | 1/2019 |
| JP | H0651901 A | 2/1994 |
| JP | H10-240389 | 9/1998 |
| JP | 2001255854 | 9/2001 |
| JP | 2002071833 | 3/2002 |
| JP | 2005221907 | 8/2005 |
| JP | 2010060746 A | 3/2010 |
| JP | 2010271339 A | 12/2010 |
| JP | 2011137874 A | 7/2011 |
| JP | 2016517087 A | 6/2016 |
| KR | 20130093962 A | 8/2013 |
| KR | 20150022673 | 3/2015 |
| KR | 20180029370 | 3/2018 |
| KR | 20190027930 | 3/2019 |
| WO | 2010071631 | 6/2010 |
| WO | 2014131188 | 9/2014 |
| WO | 2014186294 | 11/2014 |
| WO | 2014205227 | 12/2014 |
| WO | 2015026203 | 2/2016 |
| WO | 2017010654 A1 | 1/2017 |
| WO | 2020191643 | 1/2020 |
| WO | 2021258395 | 12/2021 |
| WO | 2022139895 | 6/2022 |

OTHER PUBLICATIONS

Brian Reads, "Microsoft Windows Vista SideShow—In-Depth (pics)", Notebook Review, available at www.notebookreview.com/news/microsoft-windows-vista-sideshow-in-depth-pics/ (retrieved May 6, 2019), Jan. 11, 2006, 7 pages.

Chethan, "Proximity Sensing with CapSense," Cypress AN92239, 2016, 62 pages.

Cravotta, Nicholas, "Optimizing Proximity Sensing for Consumer Electronics Applications," Digi-Key Electronics, Apr. 26, 2012, 9 pages.

Cutress, "Asus ZenBook Pro 15(UX580): A 5.5-inch Screen in the Touchpad", retrieved from https://www.anandtech.com/show/12880/asus-zenbook-pro-15-ux580-a-55inch-screen-in-the-touchpad, Jun. 5, 2018, 5 pages.

European Patent Office, "Extended European Search Report" issued in connection with European Patent Application No. 20194494.9, dated Feb. 17, 2021, 62 pages.

European Patent Office, "Extended European Search Report," issued in connection with European Patent Application No. 20164273.3, dated Oct. 9, 2020, 14 pages.

European Patent Office, "Extended European Search Report," issued in connection with European Patent Application No. 20197335.1, dated Jul. 16, 2021, 11 pages.

European Patent Office, "Extended European Search Report," issued in connection with European Patent Application No. 20197337.7, dated Mar. 9, 2021, 11 pages.

European Patent Office, "Extended Search Report," issued in connection with European Patent Application No. 20181123.9, dated Dec. 4, 2020, 11 pages.

European Patent Office, "Rule 62a(1) Communication," issued in connection with European Patent Application No. 20197335.1, dated Mar. 17, 2021, 2 pages.

Gajitz, "Open Sesame! Gesture-Controlled Motorized Laptop Lid", available at https://gajitz.com/open-sesame-gesture-controlled-motorized-laptop-lid/ (retrieved May 6, 2019), Sep. 2012, 3 pages.

Indiegogo, "Cosmo Communicator", available at https://www.indiegogo.com/projects/cosmo-communicator#/ (retrieved May 6, 2019), 2018, 18 pages.

International Searching Authority, "International Preliminary Report on Patentability," issued in connection with PCT/US2016/048953, dated Mar. 27, 2018, 10 pages.

International Searching Authority, "International Search Report," issued in connection with PCT Application No. PCT/US2016/048953, dated Nov. 23, 2016.

International Searching Authority, "Search Report and Written Opinion ," issued in connection with PCT Application No. PCT/CN2020/098326, dated Mar. 29, 2021, 9 pages.

International Searching Authority, "Search Report," issued in connection with application No. PCT/CN2019/079790, dated Jan. 3, 2020, 4 pages.

International Searching Authority, "Written Opinion of the International Searching Authority," issued in connection with PCT Application No. PCT/US2016/048953, dated Nov. 23, 2016.

International Searching Authority, "Written Opinion," issued in connection with application No. PCT/CN2019/079790, dated Jan. 3, 2020, 4 pages.

"Jack Purcher," Google Patents a Motorized Pixelbook Lid that Opens and Closes with a Simple Touch & Auto.

Aligns the Display to the user's Face, Patently Mobile, available at https://www.patentlymobile.com/2017/11/google-patents-a-motorized-pixelbook-lid-that-opens-and-closes-with-a-simple-touch-auto-aligns-the-display-to-the-users-fa.html (retrieved May 6, 2019), Nov. 25, 2017, 6 pages.

(56) References Cited

OTHER PUBLICATIONS

Kul Bushan, "CES 2019_ Dell's new laptop can sense your presence and wake itself" Hindustan Times, available at https://www.hindustantimes.com/tech/ces-2019-dell-latitude-7400-2-in-1-laptop-launched-price-specifications-features/story-CiRoU1GoHHsHq3K3qtPZWJ.html (retrieved May 6, 2019), Jan. 5, 2019, 8 pages.

Monica Chin, "Alexa on Windows 10 Hands-On: Useful, with 1 Big Catch", Laptop Magazine, available at https://www.laptopmag.com/articles/alexa-windows-10-hands-on (retrieved May 6, 2019), Nov. 14, 2018, 6 pages.

Notebook Review, "CES 2007: Vista SideShow in HP, Fujitsu, LG and Asus Notebooks," Notebook Review, available at www.notebookreview.com/news/ces-2007-vista-sideshow-in-hp-fujitsu-lg-and-asus-notebooks/ (retrieved May 6, 2019), Jan. 8, 2007, 8 pages.

NVIDIA "PDK User's Guide: Preface Personal Media Device," Manual, published Sep. 4, 2007, 39 pages.

NVIDIA, "NVIDIA and ASUS Deliver World's First Notebook with Windows Sideshow Secondary Display," Press Release, available at https://www.nvidia.com/object/IO_38772.html (retrieved May 6, 2019), Jan. 8, 2007, 5 pages.

NVIDIA, "NVIDIA® Preface™ Platform Enables Windows Vista on the Go," Press Release, available at https://www.nvidia.com/object/IO_38775.html (retrieved May 6, 2019), Jan. 8, 2007, 5 pages.

United States Patent and Trademark Office, "Advisory Action" issued in connection with U.S. Appl. No. 14/866,894, dated Aug. 17, 2020, 3 pages.

United States Patent and Trademark Office, "Advisory Action" issued in connection with U.S. Appl. No. 14/866,894, dated Nov. 5, 2019, 6 pages.

United States Patent and Trademark Office, "Corrected Notice of Allowability" issued in connection with U.S. Appl. No. 16/586,225, dated Mar. 16, 2022, 3 pages.

United States Patent and Trademark Office, "Corrected Notice of Allowability," issued in connection with U.S. Appl. No. 16/586,225, dated Dec. 16, 2021, 3 pages.

United States Patent and Trademark Office, "Final Office Action" issued in connection with U.S. Appl. No. 14/866,894, dated Jul. 29, 2019, 27 pages.

United States Patent and Trademark Office, "Final Office Action" issued in connection with U.S. Appl. No. 14/866,894, dated Jun. 23, 2020, 33 pages.

United States Patent and Trademark Office, "Final Office Action," issued in connection with U.S. Appl. No. 14/866,894, dated May 11, 2021, 17 pages.

United States Patent and Trademark Office, "Non Final Office Action" issued in connection with U.S. Appl. No. 14/866,894, dated Feb. 21, 2020, 30 pages.

United States Patent and Trademark Office, "Non Final Office Action" issued in connection with U.S. Appl. No. 14/866,894, dated Oct. 8, 2020, 40 pages.

United States Patent and Trademark Office, "Non-Final Office Action" issued in connection with U.S. Appl. No. 14/866,894, dated Dec. 14, 2018, 24 pages.

United States Patent and Trademark Office, "Non-Final Office Action" issued in connection with U.S. Appl. No. 16/728,899, dated Dec. 8, 2021, 9 pages.

United States Patent and Trademark Office, "Non-Final Office Action," issued in connection with U.S. Appl. No. 16/586,225, dated Jun. 15, 2021, 28 pages.

United States Patent and Trademark Office, "Non-Final Office Action," issued in connection with U.S. Appl. No. 16/725,467, dated Apr. 7, 2022, 19 pages.

United States Patent and Trademark Office, "Notice of Allowance and Fee(s) Due" issued in connection with U.S. Appl. No. 16/421,217, dated Mar. 9, 2022, 14 pages.

United States Patent and Trademark Office, "Notice of Allowance and Fee(s) Due," issued in connection with U.S. Appl. No. 14/866,894, dated Jul. 30, 2021, 8 pages.

United States Patent and Trademark Office, "Notice of Allowance," issued in connection with U.S. Appl. No. 16/586,225, dated Dec. 8, 2021, 6 pages.

Bogdan Popa, "Intel Considering Microsoft Surface Killer with Curved Display," Feb. 6, 2017, retrieved on May 26, 2023, retrieved from https://news.softpedia.com/news/intel-considering-microsoft-surface-killer-with-curved-display-512636.shtml, 2 pages.

European Patent Office, "Communication pursuant to Article 71(3) EPC," issued in connection with European Patent Application No. 20164273.3, dated Dec. 23, 2022, 78 pages.

European Patent Office, "Communication pursuant to Article 94(3) EPC," issued in connection with European Patent Application No. 20164273.3, dated Sep. 28, 2021 9 pages.

European Patent Office, "Communication pursuant to Article 94(3) EPC," issued in connection with European Patent Application No. 20194494.9, dated Jan. 24, 2023, 6 pages.

European Patent Office, "Extended European Search Report," issued in connection with European Patent Application No. 19921860.3, dated Oct. 10, 2022, 8 pages.

Intellectual Property India, "Examination Report," issued in connection with Indian Patent Application No. 202147037534, dated Feb. 2, 2023, 6 pages.

International Searching Authority, "International Preliminary Report on Patentability," issued in connection with application No. PCT/CN2019/079790, dated Sep. 28, 2021, 5 pages.

International Searching Authority, "International Search Report", issued in connection with PCT. Application No. PCT/US2021/049649, dated Jan. 14, 2022, 5 pages.

International Searching Authority, "International Search Report," issued in connection with PCT Application No. PCT/CN2022/084726, dated Jan. 4, 2023, 4 pages.

International Searching Authority, "Invitation to Pay Additional Fees," issued in connection with PCT/US2021/049649, dated Nov. 26, 2021, 7 pages.

International Searching Authority, "Written Opinion", issued in connection with PCT. Application No. PCT/US2021/049649, dated Jan. 14, 2022, 9 pages.

International Searching Authority, "Written Opinion," issued in connection with PCT Application No. PCT/CN2022/084726, dated Jan. 4, 2023, 4 pages.

Japanese Patent Office, "Notice of Reasons for Rejection," issued in connection with Japanese Patent Application No. 2021-538701, dated Feb. 21, 2023, 7 pages (English translation included).

The Netherlands Patent Office, "Office Action," issued in connection with Netherlands Application No. 2029823, dated Mar. 15, 2023, 14 pages (Written Opinion Provided in English).

United States Patent and Trademark Office, "Non-Final Office Action," issued in connection with U.S. Appl. No. 16/421,217, dated Oct. 27, 2021, 42 pages.

United States Patent and Trademark Office, "Advisory Action," issued in connection with U.S. Appl. No. 16/725,467, dated Jan. 4, 2023, 3 pages.

United States Patent and Trademark Office, "Advisory Action," issued in connection with U.S. Appl. No. 16/728,899, dated Oct. 5, 2022, 2 pages.

United States Patent and Trademark Office, "Corrected Notice of Allowability," issued in connection with U.S. Appl. No. 16/421,217, dated May 27, 2022, 2 pages.

United States Patent and Trademark Office, "Corrected Notice of Allowability," issued in connection with U.S. Appl. No. 16/586,225, dated Dec. 7, 2022, 3 pages.

United States Patent and Trademark Office, "Corrected Notice of Allowability," issued in connection with U.S. Appl. No. 16/586,225, dated May 18, 2022, 3 pages.

United States Patent and Trademark Office, "Corrected Notice of Allowability," issued in connection with U.S. Appl. No. 16/586,225, dated Sep. 19, 2022, 2 pages.

United States Patent and Trademark Office, "Corrected Notice of Allowability," issued in connection with U.S. Appl. No. 17/856,587, dated Feb. 14, 2023, 2 pages.

(56) References Cited

OTHER PUBLICATIONS

United States Patent and Trademark Office, "Corrected Notice of Allowability," issued in connection with U.S. Appl. No. 17/856,587, dated Jan. 10, 2023, 2 pages.
United States Patent and Trademark Office, "Final Office Action," issued in connection with U.S. Appl. No. 16/725,467, dated Aug. 18, 2022, 29 pages.
United States Patent and Trademark Office, "Final Office Action," issued in connection with U.S. Appl. No. 16/728,774, dated Sep. 22, 2021, 20 pages.
United States Patent and Trademark Office, "Final Office Action," issued in connection with U.S. Appl. No. 16/728,899, dated Jun. 24, 2022, 10 pages.
United States Patent and Trademark Office, "Final Office Action," issued in connection with U.S. Appl. No. 17/434,603, dated Feb. 8, 2023, 17 pages.
United States Patent and Trademark Office, "Non-Final Office Action" issued in connection with U.S. Appl. No. 16/728,899, dated Oct. 20, 2022, 9 pages.
United States Patent and Trademark Office, "Non-Final Office Action," issued in connection with U.S. Appl. No. 16/728,774, dated May 3, 2021, 12 pages.
United States Patent and Trademark Office, "Non-Final Office Action," issued in connection with U.S. Appl. No. 17/129,465, dated Jan. 5, 2023, 12 pages.
United States Patent and Trademark Office, "Non-Final Office Action," issued in connection with U.S. Appl. No. 17/434,603, dated Jul. 5, 2022, 15 pages.
United States Patent and Trademark Office, "Notice of Allowability," issued in connection with U.S. Appl. No. 29/673,785 dated Feb. 19, 2021, 2 pages.
United States Patent and Trademark Office, "Notice of Allowance and Fee(s) Due" issued in connection with U.S. Appl. No. 16/421,217, dated Mar. 24, 2022, 3 pages.
United States Patent and Trademark Office, "Notice of Allowance and Fee(s) Due," issued in connection with U.S. Appl. No. 16/586,225, dated Apr. 29, 2022, 6 pages.
United States Patent and Trademark Office, "Notice of Allowance and Fee(s) Due," issued in connection with U.S. Appl. No. 16/586,225, dated Aug. 31, 2022, 5 pages.
United States Patent and Trademark Office, "Notice of Allowance and Fee(s) Due," issued in connection with U.S. Appl. No. 16/725,467, dated Feb. 23, 2023, 9 pages.
United States Patent and Trademark Office, "Notice of Allowance and Fee(s) Due," issued in connection with U.S. Appl. No. 16/728,774, dated Feb. 2, 2022, 9 pages.
United States Patent and Trademark Office, "Notice of Allowance and Fee(s) Due," issued in connection with U.S. Appl. No. 17/856,587, dated Dec. 9, 2022, 9 pages.
United States Patent and Trademark Office, "Notice of Allowance and Fee(s) Due," issued in connection with U.S. Appl. No. 16/728,899, dated Apr. 3, 2023, 10 pages.
United States Patent and Trademark Office, "Notice of Allowance," issued in connection with U.S. Appl. No. 29/673,785, dated Nov. 16, 2020, 8 pages.
United States Patent and Trademark Office, "Requirement for Restriction," issued in connection with U.S. Appl. No. 29/673,785, dated Aug. 27, 2020, 4 pages.
United States Patent and Trademark Office, "Supplemental Notice of Allowability," issued in connection with U.S. Appl. No. 16/725,467, dated Apr. 26, 2023, 3 pages.
United States Patent and Trademark Office, "Supplemental Notice of Allowability," issued in connection with U.S. Appl. No. 16/725,467, dated Mar. 1, 2023, 3 pages.
United States Patent and Trademark Office, "Notice of Allowance and Fee(s) Due", issued in connection with U.S. Appl. No. 18/160,419, dated Aug. 23, 2023, 11 pages.
GSMArena team, "Samsung Galaxy Fold review," GSMARENA, dated Apr. 26, 2019, retrieved from https://www.Jsmarena.com/samsung_galaxy_fold-review-1926p4.php on Jun. 8, 2023, 8 pages.
Samsung, "Samsung Galaxy Fold Now Available," Samsung Global Newsroom, retrieved rom https://news.samsung.com/global/samsung-galaxy-fold-now-available on Jun. 8, 2023, dated Sep. 5, 2019, 7 pages.
GSMARENA Team, "Samsung Galaxy Fold Long-Term Review," GSMARENA, retrieved from https://www.gsmarena.com/samsung_galaxy_fold_long_term-review-1996p7.php on Jun. 8, 2023, dated Nov. 9, 2019, 8 pages.
European Patent Office, "Communication Pursuant to Article 94(3) EPC," issued in connection with European Patent Application No. 20197337.7-1218, dated Aug. 10, 2023, 10 pages.
International Searching Authority, "International Search Report and Written Opinion," issued in connection with International Application No. PCT/US2022/022196, dated Jun. 30, 2022, 10 pages.
United States Patent and Trademark Office, "Final Office Action," issued in connection with U.S. Appl. No. 17/129,465, dated Jul. 7, 2023, 15 pages.
United States Patent and Trademark Office, "Notice of Allowance," issued in connection with U.S. Appl. No. 16/725,467, dated Jun. 29, 2023, 6 pages.
International Searching Authority, "International Preliminary Report on Patentability," issued in connection with International application No. PCT/US2021/049649, dated Jun. 13, 2023, 10 pages.
Japanese Patent Office, "Decision of Refusal," issued in connection with Japanese Patent Application No. 2021-538701, dated Jun. 6, 2023, 6 pages. [English Translation Included].
Japanese Patent Center, "Search Report," issued in connection with Japanese Patent Application No. 2021-538701, dated Feb. 15, 2023, 58 pages (English Translation Included).
European Patent Office, "Communication under Rule 71(3) EPC," in connection with European Patent Application No. 20164273.3-1224, dated Jul. 29, 2022, 5 pages.
International Bureau, "International Preliminary Report on Patentability," issued in connection with PCT No. PCT/CN2020/098326, dated Dec. 13, 2022, 5 pages.
United States Patent and Trademark Office, "Non-Final Office Action," issued in connection with U.S. Appl. No. 29/771,488, dated Oct. 11, 2023, 6 pages.
Japanese Patent Office, "Notice of Reasons for Rejection," issued in connection with Japanese Patent Application No. 2021-538701, dated Mar. 3, 2023, 8 pages ( English translation included).
European Patent Office, "Extended European Search Report," in connection with European Patent Application No. 23154752.2-1224, dated May 4, 2023, 14 pages.
United States Patent and Trademark Office, "Corrected Notice of Allowability," issued in connection with U.S. Appl. No. 17/856,587, dated Jul. 3, 2023, 2 pages.
United States Patent and Trademark Office, "Corrected Notice of Allowability," issued in connection with U.S. Appl. No. 17/856,587, dated Sep. 5, 2023, 2 pages.
United States Patent and Trademark Office, "Non-Final Office Action," issued in connection with U.S. Appl. No. 17/434,603, dated Sep. 7, 2023, 17 pages.
European Patent Office, "Communication pursuant to Article 94(3) EPC," issued in connection with European Patent Application No. 20197335.1-1224, dated Oct. 5, 2023, 5 pages.
United States Patent and Trademark Office, "Notice of Allowability" issued in connection with U.S. Appl. No. 18/160,419, dated Dec. 13, 2023, 2 pages.
United States Patent and Trademark Office, "Notice of Allowance and Fee(s) Due," issued in connection with U.S. Appl. No. 17/434,603, dated Dec. 26, 2023, 9 pages.
United States Patent and Trademark Office, "Notice of Allowance and Fee(s) Due," issued in connection with U.S. Appl. No. 17/132,838, dated Mar. 6, 2024, 8 pages.

* cited by examiner

APPARATUS AND METHODS FOR THERMAL MANAGEMENT OF ELECTRONIC USER DEVICES BASED ON USER ACTIVITY

RELATED APPLICATION

This patent arises from a continuation of U.S. patent application Ser. No. 16/728,774 (now U.S. Pat. No. 11,360, 528), which was filed on Dec. 27, 2019. U.S. patent application Ser. No. 16/728,774 is hereby incorporated herein by reference in its entirety. Priority to U.S. patent application Ser. No. 16/728,774 is hereby claimed.

FIELD OF THE DISCLOSURE

This disclosure relates generally to electronic user devices and, more particularly, to apparatus and methods for thermal management of electronic user devices.

BACKGROUND

During operation of an electronic user device (e.g., a laptop, a tablet), hardware components of the device, such as a processor, a graphics card, and/or battery, generate heat. Electronic user devices include one or more fans to promote airflow to cool the device during use and prevent overheating of the hardware components.

BRIEF DESCRIPTION OF THE DRAWINGS

The figures are not to scale. In general, the same reference numbers will be used throughout the drawing(s) and accompanying written description to refer to the same or like parts.

Figure 1:
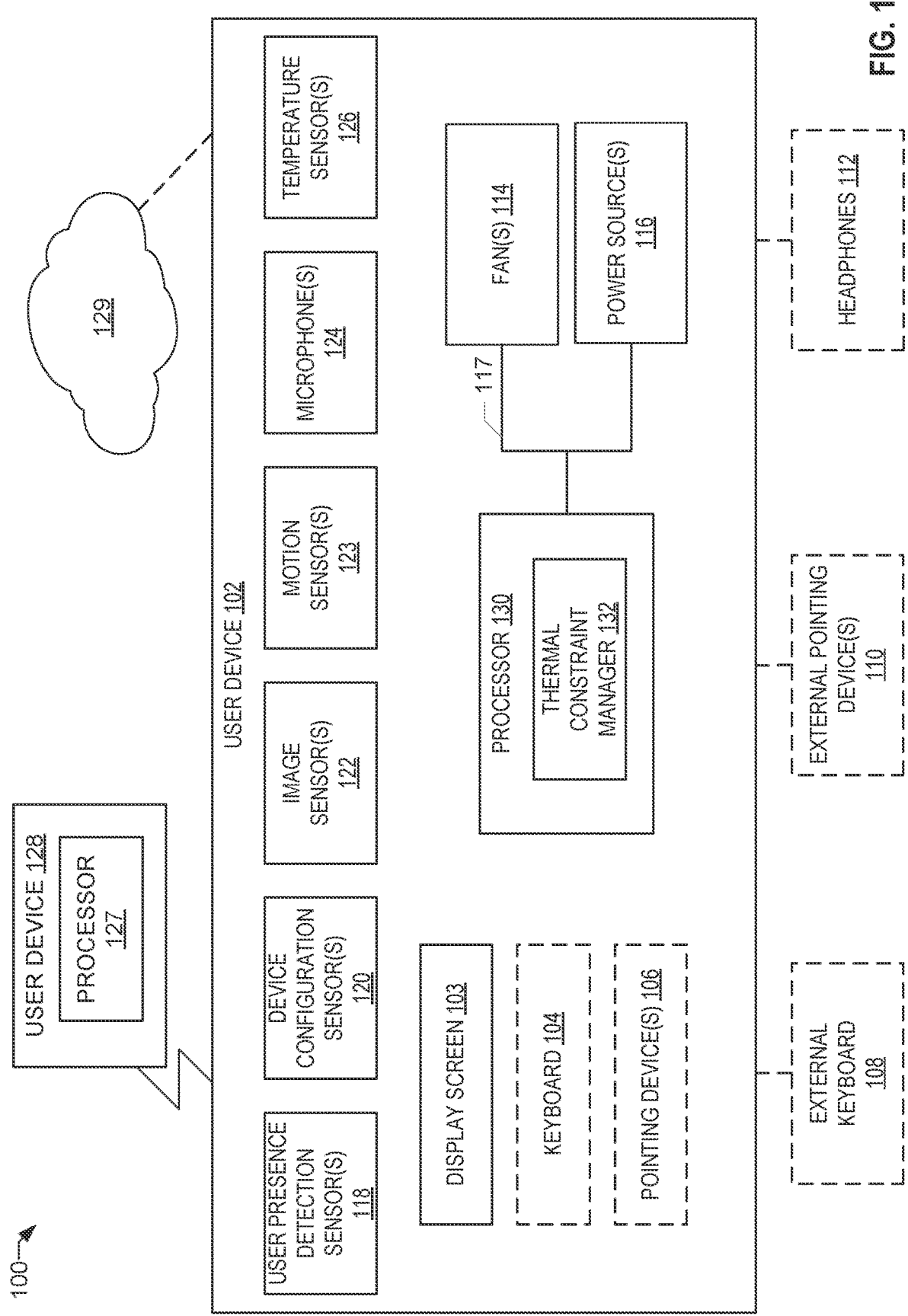
FIG. 1 illustrates an example system constructed in accordance with teachings of this disclosure and including an example user device and an example thermal constraint manager for controlling a thermal constraint of the user device.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

During operation of an electronic user device (e.g., a laptop, a tablet), hardware components disposed in a body or housing of the device, such as a processor, graphics card, and/or battery, generate heat. Heat generated by the hardware components of the user device can cause a temperature of one or more portions of an exterior surface, or skin, of the device housing to increase and become warm or hot to a user's touch. To prevent overheating of the hardware components, damage to the device, and/or discomfort to the user of the device when the user touches or places one or more portions of the user's body proximate to the skin of the device and/or components of the device accessible via the exterior surface of the housing such as a touchpad, the user device includes one or more fans to exhaust hot air generated within the body of the device and cool the device.

Some known electronic user devices are configured with one or more thermal constraints to control the temperature of the hardware components of the user device and/or of the skin of the device. The thermal constraints(s) can define, for instance, a maximum temperature of a hardware component such as a processor to prevent overheating of the processor. The thermal constraint(s) can define a maximum temperature of the skin of the device to prevent discomfort to a user touching and/or holding the device. In known user devices, operation of the fan(s) of the user device and/or management of power consumed by the device are controlled based on the thermal constraint(s). For instance, if a temperature of a hardware component of the device is approaching a maximum temperature as defined by the thermal constraint for the component, rotational speed(s) (e.g., revolutions per minute (RPMs)) of the fan(s) can be increased to exhaust hot air and reduce a temperature of the component. Additionally or alternatively, power consumption by one or more components of the device (e.g., the graphics card) may be reduced to reduce the amount of heat generated by the component and, thus, the device.

In some known user devices, the thermal constraint(s) define that a temperature of the skin of the device should not exceed, for instance, 45° C., to prevent user discomfort when the user is physically touching the device (e.g., typing on a keyboard of a laptop, scrolling on a touchscreen, etc.). Temperature of the skin of the device can be controlled by controlling power consumption of the hardware component(s) disposed within the device body to manage the amount of heat generated by the component(s) transferred to the skin of the device. However, such thermal constraint(s) can affect performance of the user device. For instance, some known user devices can operate in a high performance mode, or a mode that favors increased processing speeds over energy conservation (e.g., a mode in which processing speeds remain high for the duration that the device is in use, the screen remains brightly lit, and other hardware components do not enter power-saving mode when those components are not in use). The processor consumes increased power to accommodate the increased processing speeds associated with the high performance mode and, thus, the amount of heat generated by the processor is increased. As a result, a temperature of the skin of the user device can increase due to the increased amount of heat generated within the device housing. In some known devices, the processor may operate at lower performance speeds to consume less power and, thus, prevent the skin of the device from exceeding the maximum skin temperature defined by the thermal constraint. Thus, in some known devices, processing performance is sacrificed in view of thermal constraint(s).

Higher fan speeds can be used to facilitate of cooling of hardware component(s) of a device to enable the component(s) to operate in, for instance, a high performance mode without exceeding the thermal constraint(s) for the hardware competent(s) and/or the device skin. However, operation of the fan(s) at higher speeds increases audible acoustic noise generated by the fan(s). Thus, in some known user devices, the fan speed(s) and, thus, the amount of cooling that is provided by the fan(s), are restricted to avoid generating fan noise levels over certain decibels. Some know devices define fan noise constraints that set, for instance, a maximum noise level of 35 dBA during operation of the fan(s). As a result of the restricted fan speed(s), performance of the device may be limited to enable the fan(s) to cool the user device within the constraints of the fan speed(s).

In some instances, cooling capabilities of the fan(s) of the device degrade over time due to dust accumulating in the fan(s) and/or heat sink. Some known user devices direct the fan(s) to reverse airflow direction (e.g., as compared to the default airflow direction to exhaust hot air from the device) to facilitate heatsink and fan shroud cleaning, which helps to de-clog dust from the airflow path and maintain device performance over time. However, operation of the fan(s) in the reverse direction increases audible acoustics generated by the fan(s), which can disrupt the user's experience with the device.

Although thermal constraint(s) are implemented in a user device to prevent discomfort to the user when the user is directly touching the device (e.g., physically touching one or more components of the device accessible via the exterior housing of the device, such a keyboard and/or touchpad of a laptop, a touchscreen of a tablet, etc.), there are instances in which a temperature of the skin of the device can be increased without affecting the user's experience with the device. For instance, a user may view a video on the user device but not physically touch the user device; rather, the device may be resting on a table. In some instances, the user may interact with the user device via external accessories communicatively coupled to the device, such as an external keyboard and/or an external mouse. In such instances, because the user is not directly touching the device (i.e., not directly touching the skin of the device housing and/or component(s) accessible via the exterior surface of the housing), an increase in a temperature of the skin of the device would not be detected by the user. However, known user devices maintain the skin temperature of the device at the same temperature as if the user were directly touching the user device regardless of whether the user is interacting with the device via external accessories.

In some instances, the user device is located in a noisy environment (e.g., a coffee shop, a train station). Additionally, or alternatively, in some instances, the user may be interacting with the user device while wearing headphones. In such instances, the amount of fan noise heard by the user is reduced because of the loud environment and/or the use of headphones. However, in known user devices, the rotational speed of the fan(s) of the device are maintained at a level that minimizes noise from the fan(s) regardless of the surrounding ambient noise levels and/or whether or not the user is wearing headphones.

Disclosed herein are example user devices that provide for dynamic adjustment of thermal constraints and/or fan acoustic noise levels of the user device. Example disclosed herein use a multi-tier determination to control operation of fan(s) of the device and/or to adjust a performance level of the device and, thus, control heat generated by hardware component(s) of the device based on factors such as a presence of a user proximate to the device, user interaction(s) with the device (e.g., whether the user is using an on-board keyboard of the device or an external keyboard), and/or ambient noise levels in an environment in which the device is located. Example user devices disclosed herein include sensors to detect user presence (e.g., proximity sensor(s), image sensor(s)), device configuration (e.g., sensor(s) to detect user input(s) received via an external keyboard, sensor(s) to detect device orientation), and/or conditions in the ambient environment in which the device is located (e.g., ambient noise sensor(s)). Based on the sensor data, examples disclosed herein determine whether a temperature of the skin of the device housing can be increased relative to a default thermal constraint, where the default thermal constraint corresponds to a skin temperature for the device when the user is directly touching the device (e.g., touching one or more components of the device accessible via the exterior housing of the device such as keyboard or touchpad of a laptop). Examples disclosed herein selectively control an amount of power provided to hardware component(s) of the user device and/or fan speed level(s) (e.g., RPMs) based on the selected thermal constraint (e.g., the default thermal constraint or a thermal constraint permitting a higher skin temperature for the device relative to the default thermal constraint).

In some examples disclosed herein, power consumption by one or more component(s) of the user device (e.g., the processor) is increased when the user is determined to be providing inputs to the user device via, for instance, an external keyboard. Because the user is not physically touching the exterior surface of the device housing when the user is providing inputs via the external keyboard, the temperature of the skin of the device can be increased without adversely affecting the user (e.g., without causing discomfort to the user). In some examples disclosed herein, rotational speed(s) (e.g. RPM(s)) of the fan(s) of the user device are increased when sensor data from the ambient noise sensor(s) indicates that the user is in a loud environment. In such examples, because the user device is located in a noisy environment, the resulting increase in fan acoustics from the increased rotational speed(s) of the fan(s) is offset by the ambient noise. In some other examples, the rotational direction of the fan(s) of the user device is reversed (e.g., to facilitate heatsink and fan shroud cleaning) when sensor data from the ambient noise sensor(s) indicate that the user device is in a loud environment and/or is that the user is not present or within a threshold distance of the device. Thus, the user is not interrupted by the increased fan noise and the device can be cooled and/or cleaned with increased efficiency. Rather than maintaining the thermal constraint(s) of the device and/or the fan noise constraint(s) at respective default levels during operation of the device, examples disclosed herein dynamically adjust the constraints and, thus, the performance of the device, based on user and/or environmental factors. As a result, performance of the device can be selectively increased in view of the opportunities for increased device skin temperature and/or audible fan noise levels in response to user interactions with the device.

FIG. 1 illustrates an example system 100 constructed in accordance with teachings of this disclosure for controlling thermal constraint(s) and/or fan noise constraint(s) for a user device 102. The user device 102 can be, for example, a personal computing (PC) device such as a laptop, a desktop, an electronic tablet, a hybrid or convertible PC, etc. In some examples, the user device 102 includes a keyboard 104. In other examples, such as when the user device 102 is an electronic tablet, a keyboard is presented via a display screen 103 of the user device 102 and the user provides inputs on the keyboard by touching the screen. In some examples, the user device 102 includes one or more pointing device(s) 106 such as a touchpad. In examples disclosed herein, the keyboard 104 and the pointing device(s) 106 are carried by a housing the user device 102 and accessible via an exterior surface of the housing and, thus, can be considered on-board user input devices for the device 102.

In some examples, the user device 102 additionally or alternatively includes one or more external devices communicatively coupled to the device 102, such as an external keyboard 108, external pointing device(s) 110 (e.g., wired or wireless mouse(s)), and/or headphones 112. The external keyboard 108, the external pointing device(s) 110, and/or the headphones 112 can be communicatively coupled to the user device 102 via one or more wired or wireless connections. In the example of FIG. 1, the user device 102 includes one or more device configuration sensor(s) 120 that provide means for detecting whether user input(s) are being received via the external keyboard 108 and/or the external pointing device(s) 110 and/or whether output(s) (e.g., audio output(s)) are being delivered via the headphones 112 are coupled to the user device 102. In some examples, the device status sensor(s) 120 detect a wired connection of one or more of the external devices 108, 110, 112 via a hardware interface (e.g., USB port, etc.). In other examples, the device configuration sensor(s) 120 detect the presence of the external device(s) 108, 110, 112 via wireless connection(s) (e.g., Bluetooth). In some examples, the device configuration sensor(s) 120 include accelerometers to detect an orientation of the device 102 (e.g., tablet mode) and/or sensor(s) to detect an angle of, for instance, a screen of a laptop (e.g., facing the laptop base, angled away from the base, etc.).

The example user device 102 includes a processor 130 that executes software to interpret and output response(s) based on the user input event(s) (e.g., touch event(s), keyboard input(s), etc.). The user device 102 of FIG. 1 includes one or more power sources 116 such as a battery to provide power to the processor 130 and/or other components of the user device 102 communicatively coupled via a bus 117.

In the example of FIG. 1, the hardware components of the device 102 (e.g., the processor 130, a video graphics card, etc.) generate heat during operation of the user device 102. The example user device 102 includes temperature sensor(s) 126 to measure temperature(s) associated with the hardware component(s) of the user device 102. In the example of FIG. 1, the temperature sensor(s) 126 measure a temperature of a skin of the housing of the user device 102, or an exterior surface of the user device that can be touched by a user (e.g., a base of a laptop) (the terms "user" and "subject" are used interchangeably herein and both refer to a biological creature such as a human being). The temperature sensor(s) 126 can be disposed in the housing of the device 102 proximate to the skin (e.g., coupled to a side of the housing opposite the side of the housing that is visible to the user). The temperature sensor(s) 126 can include one or more thermometers.

The example user device 102 of FIG. 1 includes one or more fan(s) 114. The fan(s) 114 provide means for cooling and/or regulating the temperature of the hardware component(s) (e.g., the processor 130) of the user device 102 in response to temperature data generated by the temperature sensor(s) 126. In the example of FIG. 1, operation of the fan(s) 114 is controlled in view of one or more thermal constraints for the user device 102 that define temperature settings for the hardware component(s) of the device 102 and/or a skin temperature of the device 102. In some examples, operation of the fan(s) 114 of the example user device 102 of FIG. 1 is controlled based on one or more fan acoustic constraints that define noise level(s) (e.g., decibels) to be generated during operation of the fan(s) 114. In the example of FIG. 1, the thermal constraint(s) and/or fan acoustic constraint(s) for the device 102 are dynamically selected based on the user interaction(s) with the device 102 and/or ambient conditions in an environment in which the device 102 is located.

The example user device 102 of FIG. 1 includes one or more user presence detection sensor(s) 118. The user presence detection sensor(s) 118 provide a means for detecting a presence of a user relative to the user device 102 in an environment in which the user device 102 is located. For example, the user presence detection sensor(s) 118 may detect a user approaching the user device 102. In the example of FIG. 1, the user presence detection sensor(s) 118 include proximity sensor(s) that emit electromagnetic radiation (e.g., light pulses) and detect changes in the signal due to the presence of a person or object (e.g., based on reflection of the electromagnetic radiation (e.g., light pulses). In some examples, the user presence detection sensor(s) 118 include time-of-flight (TOF) sensors that measure a length of time for light to return to the sensor after being reflected off a person or object, which can be used to determine depth. The example user presence detection sensor(s) 118 can include other types of depth sensors, such as sensors that detect changes based on radar or sonar data. In some instances, the user presence detection sensor(s) 118 collect distance measurements for one or more (e.g., four) spatial regions (e.g., non-overlapping quadrants) relative to the user device 102. The user presence detection sensor(s) 118 associated with each region provide distance range data for region(s) of the user's face and/or body corresponding to the regions.

The user presence detection sensor(s) 118 are carried by the example user device 102 such that the user presence detection sensor(s) 118 can detect changes in an environment in which the user device 102 is located that occur with a range (e.g., a distance range) of the user presence detection sensor(s) 118 (e.g., within 10 feet of the user presence detection sensor(s) 118, within 5 feet, etc.). For example, the user presence detection sensor(s) 118 can be mounted on a bezel of the display screen 103 and oriented such that the user presence detection sensor(s) 118 can detect a user approaching the user device 102. The user presence detection sensor(s) 118 can additionally or alternatively be at any other locations on the user device 102 where the sensor(s) 118 face an environment in which the user device 102 is located, such as on a base of the laptop (e.g., on an edge of the base in front of a keyboard carried by base), a lid of the laptop, on a base of the laptop supporting the display screen 103 in examples where the display screen 103 is a monitor of a desktop or all-in-one PC, etc.

In some examples, the user presence detection sensor(s) 118 are additionally or alternatively mounted at locations on the user device 102 where the user's arm, hand, and/or finger(s) are likely to move or pass over as the user brings his or her arm, hand, and/or finger(s) toward the display screen 103, the keyboard 104, and/or other user input device (e.g., the pointing device(s) 106). For instance, in examples in which the user device 102 is laptop or other device including a touchpad, the user presence detection sensor(s) 118 can be disposed proximate to the touchpad of the device 102 to detect when a user's arm is hovering over the touchpad (e.g., as the user reaches for the screen 103 or the keyboard 104).

In the example of FIG. 1, the user device 102 includes image sensor(s) 122. In this example, the image sensor(s) 122 generate image data that is analyzed to detect, for example, a presence of the user proximate to the device, gestures performed by the user, whether the user is looking toward or away from the display screen 103 of the device 102 (e.g., eye-tracking), etc. The image sensor(s) 122 of the user device 102 include one or more cameras to capture image data of the surrounding environment in which the device 102 is located. In some examples, the image sensor(s) 122 include depth-sensing camera(s). In the example of FIG. 1, the image sensor(s) 122 are carried by the example user device 102 such that when a user faces the display screen 103, the user is within a field of view of the image sensor(s) 122. For example, the image sensor(s) 122 can be carried by a bezel of the display screen 103.

The example user device 102 of FIG. 1 includes one or more motion sensor(s) 123. The motion sensor(s) 123 can include, for example, infrared sensor(s) to detect user movements. As disclosed herein, data generated by the motion sensor(s) 123 can be analyzed to identify gestures performed by the user of the user device 102. The motion sensor(s) 123 can be carried by the device 102 proximate to, for example, a touchpad of the device 102, a bezel of the display screen 103, etc. so as to detect user motion(s) occurring proximate to the device 102.

In the example of FIG. 1, the user device 102 includes one or more microphone(s) 124 to detect sounds in an environment in which the user device 102 is located. The microphone(s) 124 can be carried by the user device 102 at one or more locations, such as on a lid of the device 102, on a base of the device 102 proximate to the keyboard 104, etc.

The example user device 102 of FIG. 1 can include other types of sensor(s) to detect user interactions relative to the device 102 and/or environmental conditions (e.g., ambient light sensor(s)).

The example user device 102 includes one or more semiconductor-based processors to process sensor data generated by the user presence detection sensor(s) 118, the device configuration sensor(s) 120, the image sensor(s) 122, the motion sensor(s) 123, the microphone(s) 124, and/or the temperature sensor(s) 126. For example, the sensor(s) 118, 120, 122, 123, 124, 126 can transmit data to the on-board processor 130 of the user device 102. In other examples, the sensor(s) 118, 120, 122, 123, 124, 126 can transmit data to a processor 127 of another user device 128, such as such as a smartphone or a wearable device such as a smartwatch. In other examples, the sensor(s) 118, 120, 122, 123, 124, 126 can transmit data to a cloud-based device 129 (e.g., one or more server(s), processor(s), and/or virtual machine(s)).

In some examples, the processor 130 of the user device 102 is communicatively coupled to one or more other processors. In such an example, the sensor(s) 118, 120, 122, 123, 124, 126 can transmit the sensor data to the on-board processor 130 of the user device 102. The on-board processor 130 of the user device 102 can then transmit the sensor data to the processor 127 of the user device 128 and/or the cloud-based device(s) 129. In some such examples, the user device 102 (e.g., the sensor(s) 118, 120, 122, 123, 124, 126 and/or the on-board processor 130) and the processor(s) 127, 130 are communicatively coupled via one or more wired connections (e.g., a cable) or wireless connections (e.g., cellular, Wi-Fi, or Bluetooth connections). In other examples, the sensor data may only be processed by the on-board processor 130 (i.e., not sent off the device).

In the example system 100 of FIG. 1, the sensor data generated by the user presence detection sensor(s) 118, the device configuration sensor(s) 120, the image sensor(s) 122, the motion sensor(s) 123, the microphone(s) 124, and/or the temperature sensor(s) 126 is processed by a thermal constraint manager 132 to select a thermal constraint for the user device 102 to affect a temperature of the skin of the housing of the device 102 and/or a fan acoustic constraint to affect rotational speed(s) of the fan(s) 114 of the user device 102 and, thus, noise generated by the fan(s) 114. As a result of the selected thermal constraint and/or fan acoustic constraint, the example thermal constraint manager 132 can affect performance of the device 102. For instance, if the thermal constraint manager 132 determines that the temperature of the skin of the device 102 can be increased and/or that rotational speed(s) of the fan(s) 114 can be increased, additional power can be provided to hardware component(s) of the device 102 (e.g., the processor 130) to provide for increased performance of the component(s) (e.g., higher processing speeds). In such examples, the increased heat generated by the hardware component(s) and transferred to the skin of the device is permitted by the selected thermal constraint and/or is managed via increased rotation of the fan(s) 114. In the example of FIG. 1, the thermal constraint manager 132 is implemented by executable instructions executed on the processor 130 of the user device 102. However, in other examples, the thermal constraint manager 132 is implemented by instructions executed on the processor 127 of the wearable or non-wearable user device 128 and/or on the cloud-based device(s) 129. In other examples, the thermal constraint manager 132 is implemented by dedicated circuitry located on the user device 102 and/or the user device 128. These components may be implemented in software, firmware, hardware, or in combination of two or more of software, firmware, and hardware.

In the example of FIG. 1, the thermal constraint manager 132 serves to process the sensor data generated by the respective sensor(s) 118, 120, 122, 123, 124, 126 to identify user interaction(s) with the user device 102 and/or ambient conditions in the environment in which the device 102 is located and to select a thermal constraint and/or fan acoustic constraint for the user device 102 based on the user interaction(s) and/or the ambient environment conditions. In some examples, the thermal constraint manager 132 receives the sensor data in substantially real-time (e.g., near the time the data is collected). In other examples, the thermal constraint manager 132 receives the sensor data at a later time (e.g., periodically and/or aperiodically based on one or more settings but sometime after the activity that caused the sensor data to be generated, such as a hand motion, has occurred (e.g., seconds, minutes, etc. later)). The thermal constraint manager 132 can perform one or more operations on the sensor data such as filtering the raw signal data, removing noise from the signal data, converting the signal data from analog data to digital data, and/or analyzing the data. For example, the thermal constraint manager 132 can convert the sensor data from analog to digital data at the on-board processor 130 and the digital data can be analyzed by on-board processor 130 and/or by one or more off-board processors, such as the processor 127 of the user device 128 and/or the cloud-based device 129.

Based on the sensor data generated by the user presence detection sensor(s) 118, the thermal constraint manager 132 determines whether or not a subject is present within the range of the user presence detection sensor(s) 118. In some examples, if the thermal constraint manager 132 determines that the user is not within the range of the user presence detection sensor(s) 118, the thermal constraint manager 132 determines that the rotational speed of the fan(s) 114 can be increased, as the user is not present to hear the increased acoustic noise generated by the fan(s) 114 operating at an increased speed. The thermal constraint manager 132 generates instructs for the fan(s) 114 to increase the rotational speed at which the fan(s) 114 operate. The fan(s) 114 can continue to operate at the increased rotational speed to provide efficient until, for instance, the processor 130 of the device 102 determines that no user input(s) have been received at the device 102 for a period of time and the device 102 should enter a low power state (e.g., a standby or sleep state).

In the example of FIG. 1, if the thermal constraint manager 132 determines that a user is within the range of the user presence detection sensor(s) 118, the thermal constraint manager 132 determines if the user is interacting with the device 102. The thermal constraint manager 132 can detect whether user input(s) are being received via (a) the on-board keyboard 104 and/or the on-board pointing device(s) 106 or (b) the external keyboard 108 and/or the external pointing device(s) 110 based on data generated by the device configuration sensor(s) 120. If the user is interacting with the device 102 via the on-board keyboard 104 and/or the on-board pointing device(s) 106, the thermal constraint manager 132 maintains the skin temperature of the device 102 at a first (e.g., default) thermal constraint that defines a maximum temperature for the device skin to prevent the skin of the device housing from becoming too hot and injuring the user. If the thermal constraint manager 132 determines that the user is interacting with the device 102 via the external keyboard 108 and/or the external pointing device(s) 110, the thermal constraint manager 132 selects a thermal constraint for the device that defines an increased temperature for the skin of the device 102 relative to the first thermal constraint. As a result of the relaxation of the thermal constraint for the device 102 (i.e., the permitted increase in the skin temperature of the device), one or more hardware component(s) of the device 102 (e.g., the processor 130) move to an increased performance mode in which the component(s) of the device consume more power and, thus, generate more heat. In such examples, the thermal constraint manager 132 selects a thermal constraint for the skin temperature of the device housing that is increased relative to the thermal constraint selected when the user is interacting with the device 102 via the on-board keyboard 104 and/or the on-board pointing device(s) 106 because the user is not directly touching the device 102 when providing input(s) via the external device(s) 108, 110.

If the thermal constraint manager 132 determines that the user is within the range of the user presence detection sensor(s) 118 but is not providing input(s) at the device 102 and/or has not provided an input within a threshold period of time, the thermal constraint manager 132 infers a user intent to interact with the device. The thermal constraint manager 132 can use data from multiple types of sensors to predict whether the user is likely to interact with the device.

For example, the thermal constraint manager 132 can determine a distance of the user from the device 102 based on data generated by the user presence detection sensor(s) 118. If the user is determined to be outside of a predefined threshold range of the device 102 (e.g., farther than 1 meter from the device 102), the thermal constraint manager 132 determines that the rotational speed of the fan(s) 114 of the device 102 and, thus, the fan acoustics, can be increased because the increased fan noise will not disrupt the user in view of the user's distance from the device 102. Additionally or alternatively, the thermal constraint manager 132 determines that the power level of the power source(s) 116 of the device 102 and, thus, the device skin temperature, can be increased because the increased skin temperature will not cause discomfort to the user based on the user's distance from the device 102.

In some examples, thermal constraint manager 132 analyzes image data generated by the image sensor(s) 122 to determine a position of the user's eyes relative to the display screen 103 of the device 102. In such examples, if thermal constraint manager 132 identifies both of the user's eyes in the image data, the thermal constraint manager 132 determines that the user is looking at the display screen 103. If the thermal constraint manager 132 identifies one of the user's eyes or none of the user's eyes in the image data, the thermal constraint manager 132 determines that the user is not engaged with the device 102. In such examples, the thermal constraint manager 132 can instruct the fan(s) 114 to increase rotational speed(s) to cool the device 102. Because the user is not engaged or not likely engaged with the device 102 as determined based on eye tracking, the thermal constraint manager 132 permits increased fan noise to be generated by the fan(s) 114 to efficiently cool the device 102 while the user is distracted relative to the device 102. Additionally or alternatively, the thermal constraint manager 132 can instruct the power source(s) 116 to increase the power provided to the hardware component(s) of the user device 102 (and, thus, resulting in increased the skin temperature of the user device 102).

In some examples, the thermal constraint manager 132 analyzes the image data generated by the image data sensor(s) 122 and/or the motion sensor(s) 123 to identify gesture(s) being performed by the user. If the thermal constraint manager 132 determines that the user is, for instance, looking away from the device 102 and talking on the phone based on the image data and/or the motion sensor data (e.g. image data and/or motion sensor data indicating that the user has moved his or her hand proximate to his or her ear), the thermal constraint manager 132 determines that the fan acoustics can be increased because the user is not likely to interact with the device 102 while the user is looking away and talking on the phone.

The example thermal constraint manager 132 of FIG. 1 evaluates ambient noise conditions to determine if fan noise levels can be increased. The thermal constraint manager 132 of FIG. 1 analyzes data generated by the microphone(s) 124 to determine if ambient noise in the surrounding environment exceeds an environment noise level threshold. If the thermal constraint manager 132 determines that the ambient noise exceeds the environment noise level threshold, the thermal constraint manager 132 instructs the fan(s) to rotate at increased speed(s) and, thus, generate increased fan noise. In such examples, the increased fan noise is unlikely to be detected in the noisy environment in which the user device 102 is located and, thus, operation of the fan(s) 114 can be optimized to increase cooling and, thus, performance of the device 102.

Additionally or alternatively, the thermal constraint manager 132 can determine whether the user is wearing headphones based on, for example, image data generated by the image sensor(s) 122 and/or data from the device configuration sensor(s) 120 indicating that headphones are connected to the device 102 (e.g., via wired or wireless connection(s)). In such examples, the thermal constraint manager 132 instructs the fan(s) 114 to rotate at increased speed(s) to increase cooling of the device 102 because the resulting increased fan noise is unlikely to be detected by the user who is wearing headphones.

The thermal constraint manager 132 dynamically adjusts the thermal constraint(s) and/or fan noise levels for the device 102 based on the inferred user intent to interact with the device and/or conditions in the environment. In some examples, the thermal constraint manager 132 determines that the user likely to interact with the device after previously instructing the fan(s) to increase rotational speed(s) based on, for example, data from the user presence detection sensor(s) 118 indicating that the user is moving toward the device 102 and/or reaching for the on-board keyboard. In such examples, the thermal constraint manager 132 instructs the fan(s) 114 to reduce the rotation speed and, thus, the fan noise in view of the expectation that the user is going to interact with the device 102.

As another example, if the thermal constraint manager 132 determines that the user is providing input(s) via the external device(s) 108, 110 and, thus, selects a thermal constraint for the device 102 that increases the temperature of the skin of the device. If, at later time, the thermal constraint manager 132 determines that the user is reaching for the display screen 103 (e.g., based on data from the user presence detection sensor(s) 118, the image sensor(s) 122, and/or the motion sensor(s) 123), the thermal constraint manager selects a thermal constraint that results in decreased temperature of the device skin. In such examples, power consumption by the hardware component(s) of the device 102 and/or fan speed(s) can be adjusted to cool the device 102.

As another example, if the thermal constraint manager 132 determines at a later time that the user is no longer wearing the headphones 112 (e.g., based on the image data) after previously determining that the user was wearing the headphones 112, the thermal constraint manager 132 instructs the fan(s) 114 to reduce rotational speed to generate less noise.

In some examples, the thermal constraint manager 132 dynamically adjusts the thermal constraint(s) and/or fan acoustic constraint(s) based on temperature data generated by the temperature sensor(s) 126. For example, if data from the temperature sensor(s) 126 indicates that skin temperature is approaching the threshold defined by a selected thermal constraint, the thermal constraint manager 132 generates instructions to maintain or reduce the skin temperature by adjusting power consumption of the hardware component(s) and/or by operation of the fan(s) 114.

Figure 2:
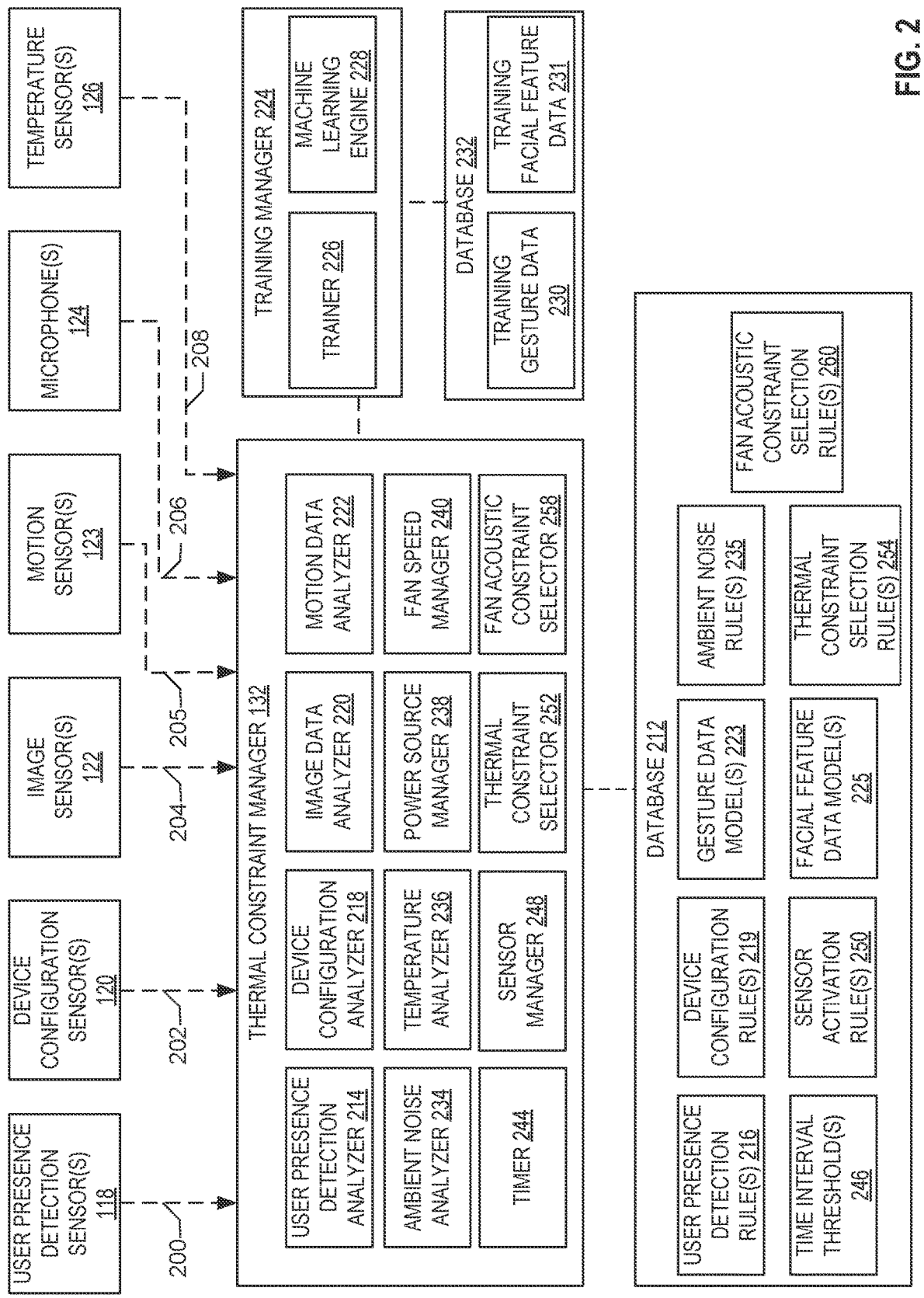
FIG. 2 is a block diagram of an example implementation of the thermal constraint manager of FIG. 1.

FIG. 2 is a block diagram of an example implementation of the thermal constraint manager 132 of FIG. 1. As mentioned above, the thermal constraint manager 132 is constructed to detect user interaction(s) and/or ambient condition(s) relative to the user device 102 and to generate instructions that cause the user device 102 to transition between one or more thermal constraints with respect to skin temperature of the device 102 and/or one or more fan acoustic constraints with respect to audible noise generated by the fan(s) 114 of the device 102. In the example of FIG. 2, the thermal constraint manager 132 is implemented by one or more of the processor 130 of the user device 102, the processor 127 of the second user device 128, and/or cloud-based device(s) 129 (e.g., server(s), processor(s), and/or virtual machine(s) in the cloud 129 of FIG. 1). In some examples, some of the user interaction analysis and/or ambient condition analysis is implemented by the thermal constraint manager 132 via a cloud-computing environment and one or more other parts of the analysis is implemented by the processor 130 of the user device 102 being controlled and/or the processor 127 of a second user device 128 such as a wearable device As illustrated in FIG. 2, the example thermal constraint manager 132 receives user presence sensor data 200 from the user presence detection sensor(s) 118 of the example user device 102 of FIG. 1, device configuration sensor data 202 from the device configuration sensor(s) 120, image sensor data 204 from the image sensor(s) 122, gesture data 205 from the motion sensor(s) 123, ambient noise sensor data 206 from the microphone(s) 124, and temperature sensor data 208 from the temperature sensor(s) 126. The sensor data 200, 202, 204, 205, 206, 208 is stored in a database 212. In some examples, the thermal constraint manager 132 includes the database 212. In other examples, the database 212 is located external to the thermal constraint manager 132 in a location accessible to the thermal constraint manager 132 as shown in FIG. 2.

The thermal constraint manager 132 includes a user presence detection analyzer 214. In this example, the user presence detection analyzer 214 provides means for analyzing the sensor data 200 generated by the user presence detection sensor(s) 118. In particular, the user presence detection analyzer 214 analyzes the sensor data 200 to determine if a user is within the range of the user presence detection sensor(s) 118 and, thus, is near enough to the user device 102 to suggest that the user is about to use the user device 102. In some examples, the user presence detection analyzer 214 determines if the user is within a particular distance from the user device 102 (e.g., within 0.5 meters of the device 102, within 0.75 meters of the device 102). The user presence detection analyzer 214 analyzes the sensor data 200 based on one or more user presence detection rule(s) 216. The user presence detection rule(s) 216 can be defined based on user input(s) and stored in the database 212.

The user presence detection rule(s) 216 can define, for instance, threshold time-of-flight (TOF) measurements by the user presence detection sensor(s) 118 that indicate presence of the user is within a range from the user presence detection sensor(s) 118 (e.g., measurements of the amount of time between emission of a wave pulse, reflection off a subject, and return to the sensor). In some examples, the user presence detection rule(s) 216 define threshold distance(s) for determining that a subject is within proximity of the user device 102. In such examples, the user presence detection analyzer 214 determines the distance(s) based on the TOF measurement(s) in the sensor data 200 and the known speed of the light emitted by the sensor(s) 118. In some examples, the user presence detection analyzer 214 identifies changes in the depth or distance values over time and detects whether the user is approaching the device 102 or moving away from the user device 102 based on the changes. The threshold TOF measurement(s) and/or distance(s) for the sensor data 200 can be based on the range of the sensor(s) 118 in emitting pulses. In some examples, the threshold TOF measurement(s) and/or distances are based on user-defined reference distances for determining that a user is near or approaching the user device 102 as compared to simply being in the environment in which the user device 102 and the user are both present.

The example thermal constraint manager 132 of FIG. 2 includes a device configuration analyzer 218. In this example, the device configuration analyzer 218 provides means for analyzing the sensor data 202 generated by the device configuration sensor(s) 120. The device configuration analyzer 218 analyzes the sensor data 202 to detect, for example, whether user input(s) are being received via the on-board keyboard 104 and/or the on-board pointing device(s) 106 of the user device 102 or via one or more external devices (e.g., the external keyboard 108, the external pointing device(s) 110) communicatively coupled to the user device 102. In some examples, the device configuration analyzer 218 detects that audio output(s) from the device 102 are being delivered via an external output device such as the headphones 112. In some examples, the device configuration analyzer 218 analyzes the orientation of the device 102 to infer, for example, whether a user is sitting while interacting with device 102, standing while interacting with the device 102 (e.g., based on an angle of a display screen of the device 102), whether the device 102 is in tablet mode, etc.

The device configuration analyzer 218 analyzes the sensor data 202 based on one or more device configuration rule(s) 219. The device configuration rule(s) 219 can be defined based on user input(s) and stored in the database 212. The device configuration rule(s) 219 can define, for example, identifiers for recognizing when external device(s) such as the headphones 112 of FIG. 1 are communicatively coupled to the user device 102 via one or more wired or wireless connections. The device configuration rule(s) 219 define rule(s) for detecting user input(s) being received at the user device via the external device(s) 108, 110 based on data received from the external device(s). The device configuration rule(s) 219 define rule(s) for detecting audio output(s) delivered via the external device such as the headphone(s) 118. The device configuration rule(s) 219 can define rule(s) indicating that if the display screen 103 is angled within a particular angle range (e.g., over 90° relative to a base of laptop), the user is sitting while interacting with the device 102.

The example thermal constraint manager 132 of FIGS. 1 and 2 is trained to recognize user interaction(s) relative to the user device 102 to predict whether the user is likely to interact with the device 102. In the example of FIG. 2, the thermal constraint manager 132 analyzes one or more of the sensor data 204 from the image sensor(s) 122 and/or the sensor data 205 from the motion sensor(s) 123 to detect user activity relative to the device 102. In the example of FIG. 2, the thermal constraint manager 132 is trained to recognize user interactions by a training manager 224 using machine learning and training sensor data for one or more subjects, which may or may not include sensor data generated by the sensor(s) 122, 123 of the user device 102 of FIG. 1. In some examples, the training sensor data is generated from subject(s) who are interacting with the user device 102 and/or a different user device. The training sensor data is stored in a database 232. In some examples, the training manager 224 includes the database 232. In other examples, the database 232 is located external to the training manager 224 in a location accessible to the training manager 224 as shown in FIG. 2. The databases 212, 232 of FIG. 2 may be the same storage device or different storage devices.

In the example of FIG. 2, the training sensor data includes training gesture data 230, or data including a plurality of gestures performed by user(s) and associated user interactions represented by the gestures in the context of interacting with the user device 102. For instance, the training gesture data 230 can include a first rule indicating that if a user raises his or her hand proximate to his or her ear, the user is talking on a telephone. The training gesture data 230 can include a second rule indicating that if a user is reaching his or her hand away from his or her body as detected by a motion sensor disposed proximate to a keyboard of the device and/or as captured in image data, the user is reaching for the display screen of the user device. The training gesture data 230 can include a third rule indicating that if only a portion of the user's body from the waist upward is visible in image data, the user is in a sitting position.

In the example of FIG. 2, the training sensor data includes training facial feature data 231, or data including a plurality of images of subject(s) and associated eye position data, mouth position data, head accessory data (e.g., headphone usage) represented by the image(s) in the context of viewing the display screen 103 of the device 102, looking away from the display screen 103 of the device 102, interacting with the device 102 while wearing headphones, etc. The training facial feature data 231 can include a first rule that if both of the user's eyes are visible in image data generated by the image sensor(s) 122 of the user device 102, then the user is looking at the display screen 103 of the device 102. The training facial feature data 231 can include a second rule that if one of the user's eyes is visible in the image data, the user is likely to interact with the device 102. The training facial feature data 231 can include a third rule that if neither of the user's eyes is visible in the image data, the user is looking away from the device 102. The training facial feature data 231 can include a fourth rule that if the user's mouth is open in the image data, the user is talking. The training facial feature data 231 can include a fifth rule that identifies when a user is wearing headphones based on feature(s) detected in the image data.

The example training manager 224 of FIG. 2 includes a trainer 226 and a machine learning engine 228. The trainer 226 trains the machine learning engine 228 using the training gesture data 230 and the training facial feature data 231 (e.g., via supervised learning) to generate one or more model(s) that are used by the thermal constraint manager 132 to control thermal constraints of the user device 102 based on user interaction(s) and/or inferred intent regarding user interaction(s) with the device 102. For example, the trainer 226 uses the training gesture data 230 to generate one or more gesture data models 223 via the machine learning engine 228 that define user interaction(s) relative to the device 102 in response to particular gestures performed by the user. As another example, the trainer 226 users the training facial feature data 231 to generate one or more facial feature data models 225 via the machine learning engine 228 that that define user interaction(s) relative to the device 102 in response to particular eye tracking positions, facial expressions of the user, and/or head accessories (e.g., headphones) worn by the user. In the example of FIG. 2, the gesture data model(s) 223 and the facial feature data model(s) 225 are stored in the database 212. The example database 212 can store additional or fewer models than shown in FIG. 2. For example, the database 212 can store a model generated during training based on the training gesture data 230 and data indicative of a distance of the user relative to the device (e.g., based on proximity sensor data)

and/or device configuration (e.g., based on sensor data indicating screen orientation).

The example thermal constraint manager 132 of FIG. 2 uses the model(s) 223, 225 to interpret the respective sensor data generated by the motion sensor(s) 123 and/or the image sensor(s) 122. The example thermal constraint manager 132 of FIG. 2 includes a motion data analyzer 222. In this example, the motion data analyzer 222 provides means for analyzing the sensor data 205 generated by the motion sensor(s) 123, The example motion data analyzer 222 uses the gesture data model(s) 223 to identify gesture(s) performed by the user relative to the device 102. For example, based on the gesture data model(s) 223 and the sensor data 205 generated by the motion sensor(s) 123 disposed proximate to, for instance, display screen 103 of the device 102 and/or a touchpad of the device 102, the motion data analyzer 222 can determine that the user is reaching for the display screen 103 of the user device 102.

The example thermal constraint manager 132 of FIG. 2 includes an image data analyzer 220. In this example, the image data analyzer 220 provides means for analyzing the sensor data 204 generated by the image sensor(s) 122. The image data analyzer 220 uses the gesture data model(s) 223 and/or the facial feature data model(s) 225 to analyzes the sensor data 204 to identify, for instance, gesture(s) being performed by the user and/or the user's posture relative to the device 102, and/or to track a position of the user's eyes relative to the device 102. For example, based on the gesture data model(s) 223 and the image sensor data 204, the image data analyzer 220 can determine that the user is typing. In other examples, based on the facial feature data model(s) 225 and the image sensor data 204 including a head of the user, the image data analyzer 220 determines that the user is turned away from the device 102 because the user's eyes are not visible in the image data.

In the example of FIG. 2, the thermal constraint manager 132 includes a timer 244. In this example, the timer 244 provides means for monitoring a duration of time within which a user input is received at the user device 102 after the user presence detection analyzer 214 determines that the user is within the range of the user presence detection sensor(s) 118. The timer 244 additionally or alternatively provides means for monitoring a duration of time in which the motion data analyzer 222 and/or the image data analyzer 220 determine that there is a likelihood of user interaction within the device after the user presence detection analyzer 214 determines that the user is within the range of the user presence detection sensor(s) 118. The timer 244 monitors the amount of time that has passed based on time interval threshold(s) 246 stored in the database 212 and defined by user input(s). As disclosed herein, if a user input is not received within the time interval threshold(s) 246 and/or if the motion data analyzer 222 and/or the image data analyzer 220 have not determined that a user interaction with the device 102 is likely to occur within the time interval threshold(s) 246, the thermal constraint manager 132 can adjust the thermal constraint(s) and/or the fan acoustic constraint(s) in response to the lack of user interaction with the device 102.

The thermal constraint manager 132 of FIG. 2 includes an ambient noise analyzer 234. In this example, the ambient noise analyzer 234 provides means for analyzing the sensor data 206 generated by the ambient noise sensor(s) 124. The ambient noise analyzer 234 analyzes the sensor data 206 based on one or more ambient noise rule(s) 235. In the example of FIG. 2, the ambient noise rule(s) 235 define threshold ambient noise level(s) that, if exceeded, indicate that a user is unlikely to detect an increase in audible fan noise. The ambient noise rule(s) 235 can be defined based on user input(s) and stored in the database 212.

The thermal constraint manager 132 of FIG. 2 includes a temperature analyzer 236. In this example, the temperature analyzer 236 provides means for analyzing the sensor data 208 generated by the temperature sensor(s) 126. The temperature analyzer 236 analyzes the sensor data 208 to determine the temperature of one or more hardware component(s) of the user device 102 and/or the skin of the housing of the user device 102. For example, the temperature analyzer 236 can detect an amount of heat generated by the processor 130 and/or a temperature of the exterior skin of the housing 102 during operation of the device 102.

The example thermal constraint manager 132 of FIG. 2 includes a sensor manager 248 to manage operation of one or more of the user presence detection sensor(s) 118, the device configuration sensor(s) 120, the image sensor(s) 122, the motion sensor(s) 122, the ambient noise sensor(s) 124, and/or the temperature sensor(s) 126. The sensor manager 248 controls operation of the sensor(s) 118, 120, 122, 124, 126 based on one or more sensor activation rule(s) 250. The sensor activation rule(s) 250 can be defined by user input(s) and stored in the database 212.

In some examples, the sensor activation rule(s) 250 define rule(s) for activating the sensor(s) to conserve power consumption by the device 102. For example, the sensor activation rule(s) 250 can define that the user presence detection sensor(s) 118 should remain active while the device 102 is operative (e.g., in a working power state) and that the image sensor(s) 122 should be activated when the user presence detection analyzer 214 determines that a user is within the range of the user presence detection sensor(s) 118. Such a rule can prevent unnecessary power consumption by the device 102 when, for instance, the user is not proximate to the device 102. In other examples, the sensor manager 248 selectively activates the image sensor(s) 122 to supplement data generated by the motion sensor(s) 123 to increase an accuracy with which the gesture(s) of the user are detected. In some examples, the sensor manager 248 deactivates the image sensor(s) 122 if the image data analyzer 220 does not predict a likelihood of a user interaction with the device and/or the device 102 does not receive a user input within a time threshold defined by the timer 244 to conserve power.

The example thermal constraint manager 132 of FIG. 2 includes a thermal constraint selector 252. In the example of FIG. 2, the thermal constraint selector 252 selects a thermal constraint to be assigned to the user device 102 based on one or more of data from the user presence detection analyzer 214, the device configuration analyzer 218, the motion data analyzer 222, the image data analyzer 220, the ambient noise analyzer 234, and/or the temperature analyzer 236. The example thermal constraint selector 252 selects the thermal constraint to be assigned to the user device based on one or more thermal constraint selection rule(s) 254. The thermal constraint selection rule(s) 254 are defined based on user input(s) and stored in the database 212.

For example, the thermal constraint selection rule(s) 254 can include a first rule that if the device configuration analyzer 218 determines that the user is providing input(s) via a keyboard or touch screen of the device 102, a first, or default thermal constraint for the temperature of the skin of the housing device 102 should be assigned to the user device 102 to prevent discomfort to the user when touching the device 102. The default thermal constraint for the skin temperature can be for, for example, 45° C. The thermal constraint selection rule(s) 254 can include a second rule that if the device configuration analyzer 218 determines that the user is providing input(s) via the external keyboard 108, a second thermal constraint should be assigned to the device 102, where the second thermal constraint provides for an increased skin temperature of the device as compared to the first (e.g., default) thermal constraint. For example, the second thermal constraint can define a skin temperature limit of 48° C.

The example thermal constraint manager 132 of FIG. 2 includes a fan acoustic constraint selector 258. In the example of FIG. 2, the fan acoustic constraint selector 258 selects a fan acoustic constraint to be assigned to the user device 102 based on one or more of data from the user presence detection analyzer 214, the device configuration analyzer 218, the motion data analyzer 222, the image data analyzer 220, the ambient noise analyzer 234, and/or the temperature analyzer 236. The example thermal constraint selector 252 selects the fan acoustic constraint to be assigned to the user device 102 based one or more fan acoustic constraint selection rule(s) 260. The fan acoustic constraint selection rule(s) 260 are defined based on user input(s) and stored in the database 212.

For example, the fan acoustic constraint selection rule(s) 260 can include a first or default rule for the fan noise level based on data from the user presence detection analyzer 214 indicating that the user is within a first range of the user presence detection sensor(s) 118 (e.g., 0.5 meters from the device 102). The first rule can define a sound pressure level corresponding to 35 dBA for noise generated by the fan(s). The fan acoustic constraint selection rule(s) 260 can include a second rule for the fan noise level based on data from the user presence detection analyzer 214 indicating that the user is within a second range of the user presence detection sensor(s) 118 (e.g., 1 meter from the device 102), where the second rule defines a sound pressure level corresponding to a sound pressure level (e.g., 41 dBA) for noise generated by the fan(s) 114 that is greater than the sound pressure level defined by the first rule. The fan acoustic constraint selection rule(s) 260 can include a third rule for the fan noise level based on data from the image data analyzer 220 indicating that the user is turned away from the user device 102. The third rule can define a fan speed and, thus, acoustic noise level, that is increased relative to the fan speed and associated acoustic noise defined by the first or default fan acoustic rule in view of the determination that the user is not interacting or not likely interacting with the device 102. The fan acoustic constraint selection rule(s) 260 can include a fourth rule indicating that if the device configuration analyzer 218 determines that an angle of a display screen of the device 102 is within a particular angle range relative to, for instance, a base of a laptop, the user is sitting when interacting with the device 102 and, thus, located closer to the device than if the user is standing. In such examples, the fourth rule can define a reduced fan acoustic noise level as compared to if the user is standing or located farther from the device 102.

The fan acoustic constraint selection rule(s) 260 can include a fifth rule indicating that if the device configuration analyzer 218 that headphones are coupled to the device 102 and/or the image data analyzer 220 determine that the user is wearing headphones, the fan acoustic noise can be increased relative to the default fan noise level. The fan acoustic constraint selection rule(s) 260 can include a fifth rule indicating that if the ambient noise analyzer 234 determines that the fan noise exceeds an ambient noise threshold, the fan acoustic noise can be increased relative to the default fan noise level. The fan acoustic constraint selection rule(s) 260 can include a sixth rule indicating that if the device configuration analyzer 218, the image data analyzer 220, and/or the motion data analyzer 222 do not detect a user input and/or a predict a likelihood of a user interaction with the device 102 within the time interval threshold(s) 246 as monitored by the timer 244, the fan acoustic noise should be increased because the user is not likely interacting with the device 102.

In the example of FIG. 2, the thermal constraint selector 252 and the fan acoustic constraint selector 258 can communicate to optimize performance of the device 102, thermal constraints for the skin of the device 102, and fan acoustic noise levels in view of user interaction(s) and/or ambient conditions. For example, if the device configuration analyzer 218 determines that user is providing user inputs via an external device, the thermal constraint selector 252 can select a first thermal constraint that results in increased skin temperature of the device (e.g., 46° C.) relative to a default temperature (e.g., 45° C.). If the ambient noise analyzer 234 determines that the user device is in a quiet environment, the fan acoustic constraint selector 258 can select a first fan acoustic constraint for the device 102 that permits a modest increase in fan noise level(s) (e.g., 38 dBA) over a default level (e.g., 35 dBA) to accommodate the increased heat permitted by the first thermal constraint and prevent overheating of the device 102. However, if the ambient noise analyzer 234 determines that the user device 102 is in a loud environment, the thermal constraint selector 252 can select a second thermal constraint for the device 102 that provides for an increased skin temperature (e.g., 48° C.) over the first thermal constraint (e.g., 46° C.) and the default thermal constraint (e.g., 45° C.) and, thus, permits increased device performance as result of increased power consumption by the device component(s). Also, the fan acoustic constraint selector can select a second fan acoustic constraint for the device 102 that permits an increase in fan noise level(s) (e.g., 41 dBA) over the first fan constraint (e.g., 38 dBA) and the default fan acoustic constraint (e.g., 35 dBA). Because the device 102 is in a loud environment, the performance of the device 102 can be increased by permitting increased heat to be generated by the component(s) of the device 102 as compared to if the device 102 where in a quiet environment and the fan acoustic constraints were limited in view of low ambient noise.

The thermal constraint manager 132 of FIG. 2 includes a power source manager 238. In this example, the power source manager 238 generates instruction(s) that are transmitted to the power source(s) 116 of the user device 102 of FIG. 1 to control the power provided to the processor 130 and/or other hardware components of the user device 102 (e.g., a video graphics card). As disclosed herein, increasing the power provided to the hardware component(s) of the device 102 increases the performance level of those component(s) (e.g., the responsiveness, availability, reliability, recoverability, and/or throughput of the processor 130). In the example of FIG. 2, the thermal constraint selector 252 communicates with the power source manager 238 to increase or decrease the power provided to the hardware component(s) of the device 102 in view of the selected thermal constraint(s). For example, if the thermal constraint selector 252 selects a thermal constraint for the device skin temperature that allows the skin temperature to increase relative to a default skin temperature limit, the power source manager 238 generates instructions for increased power to be provided to the hardware component(s) of the device 102. If the thermal constraint selector 252 determines that the skin temperature of the device 102 should be reduced (e.g., in response to a change in user interaction with the device 102), the power source manager 238 generates instructions for power provided to the hardware component(s) of the device 102 to be reduced to decrease the amount of heat generated by the component(s). The example power source manager 238 transmits the instruction(s) to the power source 116 via one or more wired or wireless connections.

The example thermal constraint manager 132 of FIG. 2 includes a fan speed manager 240. The fan speed manager 240 generates instruction(s) to control the fan speed (e.g., revolutions per minute) of the fan(s) 114 of the user device 102 of FIG. 1 in response to selection of a fan acoustic constraint by the fan acoustic constraint selector 258. In some examples, the fan speed manager 240 generates instruction(s) to control speed of the fan(s) 114 in response to selection of a thermal constraint by the thermal constraint selector 252 to prevent, for instance, overheating of the hardware component(s) of the device when the selected thermal constraint permits an increase in skin temperature of the device 102. The fan speed manager 240 transmits the instruction(s) to the fan(s) 114 via one or more wired or wireless connections.

In some examples, the fan acoustic constraint selector 258 selects a fan acoustic constraint associated with increased fan acoustic noise when the user presence detection analyzer 214 does not detect the presence of a user within the range of the user presence detection sensor(s) 118 or when the user presence detection analyzer 214 determines that the user is a predefined distance from the device 102 to facilitate heatsink and fan shroud cleaning of heatsink(s) and fan shroud(s) of the device 102 (e.g., to remove accumulated dust). Because heatsink and fan shroud cleaning can increase acoustic generated by the fan(s) 114 when rotation of the fan(s) 114 are reversed to perform the cleaning, the fan acoustic constraint selector 258 can select a fan acoustic constraint for the device 102 and communicate with the fan speed manager 240 to perform the cleaning when user(s) are not proximate to the device 102. In such examples, the acoustic noise of the fan(s) 114 can be increased without disrupting a user interacting with the device 102 and longevity of the device performance can be increased though periodic cleanings.

The example thermal constraint selector 252 of FIGS. 1 and/or 2 dynamically selects the thermal constraint to be assigned to the device 102 based on analysis of the sensor data. For example, at first time, the thermal constraint selector 252 can select a first thermal constraint for the device 102 that corresponds to increased temperature of the skin of the housing of the device 102 based on data indicating the user is providing input(s) via the external keyboard 108. If, at a later time, the gesture data analyzer detects that the user is reaching for the display screen 103 of the device 102, the thermal constraint selector 252 selects a second thermal constraint for the device 102 that reduces the skin temperature of the device. In response, the power source manager 238 generates instructions to adjust the power provided to the hardware component(s) of the device to reduce heat generated and/or the fan speed manager 240 generate instructions to adjust the fan speed(s) (e.g., increase the fan speed(s) to exhaust hot air) in view of the change in the thermal constraint selected for the device 102.

In some examples, the thermal constraint selector 252 and/or the fan acoustic constraint selector 258 selectively adjust the constraint(s) applied to the device 102 based on temperature data generated by the temperature sensor(s) 126 during operation of the device. For example, if increased power is provided to the hardware component(s) of the device 102 in response to selection of a thermal constraint the permits increased skin temperature of the housing of the device 102, the fan speed manager 240 can instruct the fan(s) 114 to increase rotational speed to prevent the skin temperature from exceeding the selected thermal constraint based on data from the temperature sensor(s) 126.

Although the example thermal constraint manager 132 of FIGS. 1 and/or 2 is discussed in connection with analysis of sensor data from the user presence detection sensor(s) 118, the user input sensor(s) 120, the image sensor(s) 122, and/or the ambient noise sensor(s) 124, the example thermal constraint manager 132 can analyze data based on other sensors of the user device 102 of FIG. 1 (e.g., ambient light sensor(s)) to evaluate user interaction(s) and/or the environment in which the device 102 is located and assign thermal and/or fan acoustic constraints to the device 102.

While an example manner of implementing the thermal constraint manager 132 of FIG. 1 is illustrated in FIG. 2, one or more of the elements, processes and/or devices illustrated in FIG. 2 may be combined, divided, re-arranged, omitted, eliminated and/or implemented in any other way. Further, the example user presence detection analyzer 214, the example device configuration analyzer 218, the example image data analyzer 220, the example motion data analyzer 222, the example ambient noise analyzer 234, the example temperature analyzer 236, the example power source manager 238, the example fan speed manager 240, the example timer 244, the example sensor manager 248, the example thermal constraint selector 252, the example fan acoustic constraint selector 258, the example database 212 and/or, more generally, the example thermal constraint manager 132 of FIG. 2 may be implemented by hardware, software, firmware and/or any combination of hardware, software and/or firmware. Thus, for example, any of the example user presence detection analyzer 214, the example device configuration analyzer 218, the example image data analyzer 220, the example motion data analyzer 222, the example ambient noise analyzer 234, the example temperature analyzer 236, the example power source manager 238, the example fan speed manager 240, the example timer 244, the example sensor manager 248, the example thermal constraint selector 252, the example fan acoustic constraint selector 258, the example database 212 and/or, more generally, the example thermal constraint manager 132 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user presence detection analyzer 214, the example device configuration analyzer 218, the example image data analyzer 220, the example motion data analyzer 222, the example motion data analyzer 222, the example ambient noise analyzer 234, the example temperature analyzer 236, the example power source manager 238, the example fan speed manager 240, the example timer 244, the example sensor manager 248, the example thermal constraint selector 252, and/or the example fan acoustic constraint selector 258, the example database 212 is/are hereby expressly defined to include a non-transitory computer readable storage device or storage disk such as a memory, a digital versatile disk (DVD), a compact disk (CD), a Blu-ray disk, etc. including the software and/or firmware. Further still, the example thermal constraint manager 132 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the training manager 224 is illustrated in FIG. 2, one or more of the elements, processes and/or devices illustrated in FIG. 2 may be combined, divided, re-arranged, omitted, eliminated and/or implemented in any other way. Further, the example trainer 224, the example machine learning engineer 228, the example database 232 and/or, more generally, the example training manager 224 of FIG. 2 may be implemented by hardware, software, firmware and/or any combination of hardware, software and/or firmware. Thus, for example, any of the example trainer 224, the example machine learning engineer 228, the example database 232 and/or, more generally, the example training manager 224 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example trainer 224, the example machine learning engineer 228, and/or the example database 232 is/are hereby expressly defined to include a non-transitory computer readable storage device or storage disk such as a memory, a digital versatile disk (DVD), a compact disk (CD), a Blu-ray disk, etc. including the software and/or firmware. Further still, the example training manager 224 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
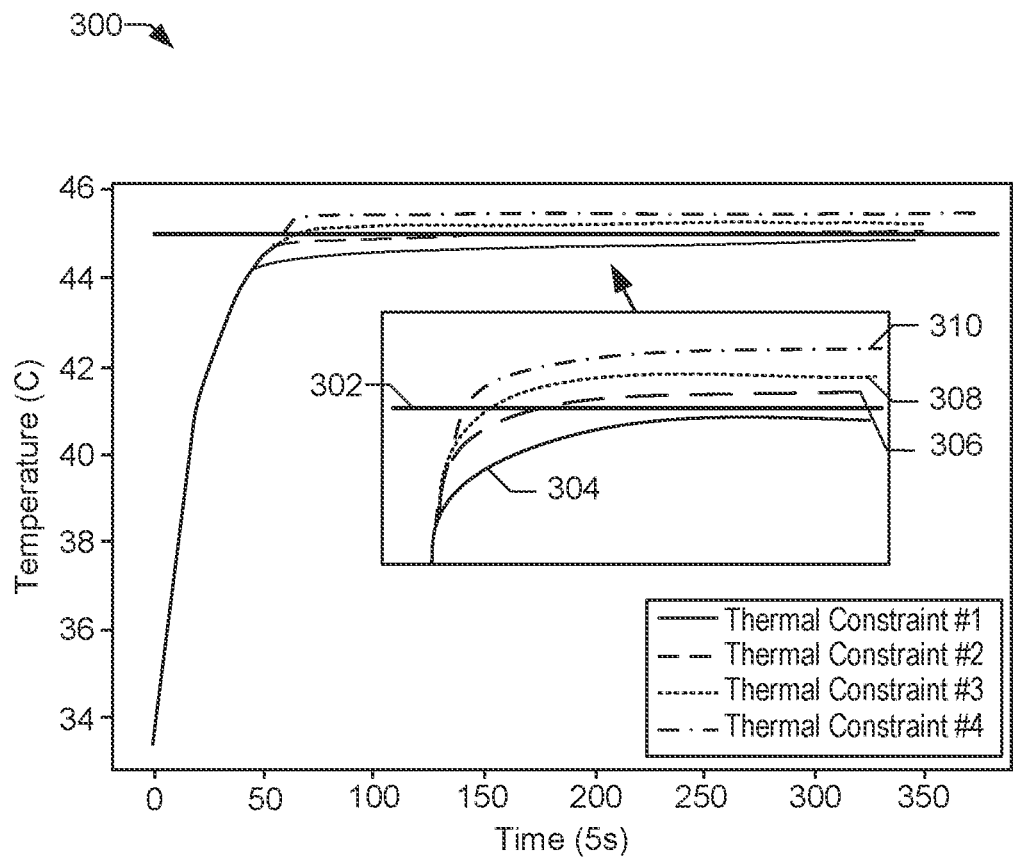
FIG. 3 illustrates example thermal constraints that may be implemented with the example user device of FIG. 1.

FIG. 3 illustrates a graph 300 of example thermal constraints that may be implemented in connection with an electronic user device such as the example user device 102 of FIG. 1 to control a temperature of an exterior surface, or skin, of the device (e.g., a housing or body of the device). In particular, the example graph 300 of FIG. 3 illustrates temperature of the skin of the user device 102 over time for different thermal constraints. A default temperature for the skin of the device 102 can be set at 45° C., as represented by line 302 in FIG. 3. A first thermal constraint 304 corresponds to a default thermal constraint in that, when implemented by the device 102, the skin temperature of the user device 102 does not exceed the default skin temperature represented by line 302. As disclosed herein, in some examples, the thermal constraint manager 132 of FIGS. 1 and/or 2 determines that a thermal constraint that permits the skin temperature of the device 102 to increase can be selected in view of, for instance, user interaction(s) with the device 102. As shown in FIG. 3, a second thermal constraint 306 provides for an increase in skin temperature relative to the first thermal constraint 304 (e.g., a skin temperature limit of 46° C.). A third thermal constraint 308 and a fourth thermal constraint 310 permit additional increases in skin temperature relative to the first and second thermal constraints 304, 306. If one or more of the second, third, or fourth thermal constraints 306, 308, 310 is selected, the power source manager 238 of the example thermal constraint manager 132 generates instructions to increases the power provided to the hardware component(s) of the user device 102, which allows the component(s) to generate more heat without violating the thermal constraint and improve performance of the device 102.

Figure 4:
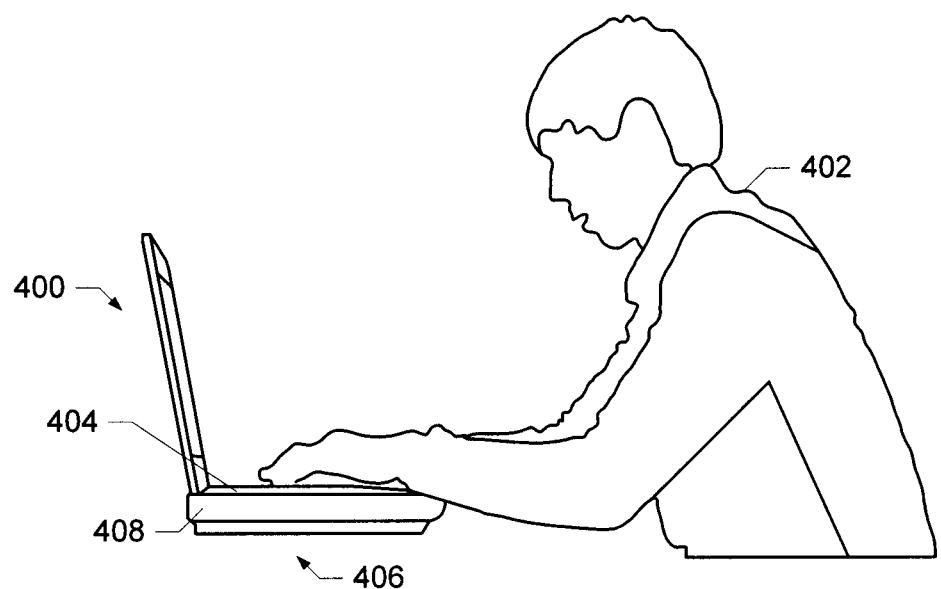
FIG. 4 illustrates an example user device constructed in accordance with teachings of this disclosure and, in particular, illustrates the user device in a first configuration associated with a first thermal constraint of the user device.

FIG. 4 illustrates an example user device 400 (e.g., the user device 102 of FIG. 1) in which examples disclosed herein may be implemented. In FIG. 4, the example user device 400 is a laptop. However, as disclosed herein, other types of user devices, such as desktops or electronic tablets, can be used to implement the examples disclosed herein.

FIG. 4 illustrates the user device 400 in a first configuration in which a user 402 interacts with the user device 400 by providing input(s) via an on-board keyboard 404 (e.g., the keyboard 104) of the device 400. The keyboard 404 is supported by a housing 406 of the device 400, where the housing 406 includes an exterior surface or skin 408 that defines the housing 406. To prevent the temperature of one or more portions of the skin 408 from becoming too hot while the user is directly touching the device 400, the example thermal constraint manager 132 of FIGS. 1 and/or 2 can select a thermal constraint for the device 400 that maintains the skin temperature at or substantially at a default level (e.g., the first thermal constraint 304 of FIG. 3 corresponding to a skin temperature of 45° C. for the skin 408). In such examples, the power source manager 238 of the example thermal constraint manager 132 manages power level(s) for the hardware component(s) of the device 400 so that the resulting temperature of the skin 408 does not exceed the thermal constraint. Additionally or alternatively, the thermal constraint manager 132 can determine the user 402 is not wearing headphones based on data generated by, for instance, the device configuration sensor(s) 120 and/or the image data sensor(s) 122 of FIG. 1. Thus, the fan constraint selector 258 can select a fan acoustic constraint for the device 400 so that the noise generated by the fan(s) of the device 400 (e.g., the fan(s) 114) do not exceed, for instance, a default fan noise level of 35 dBA.

Figure 5:
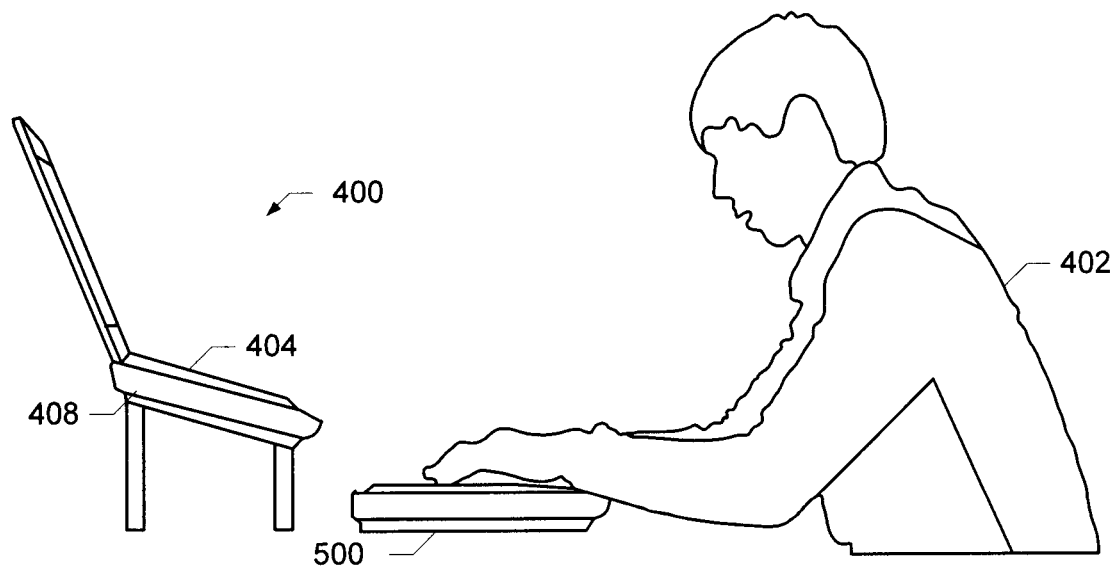
FIG. 5 illustrates the example user device of FIG. 4 and, in particular, illustrates the user device in a second configuration associated with a second thermal constraint of the user device.

FIG. 5 illustrates the example user device 400 of FIG. 4 in a second configuration in which the user 402 is interacting with the user device 102 via an external keyboard 500. Thus, because the user 402 is interacting with the user device 400 via the external keyboard 500, the user 402 is not directly touching the device 400 (e.g., the skin 408 of the device 400). In this example, the thermal constraint selector 252 can select a thermal constraint (e.g., the second, third, or fourth thermal constraints 306, 308, 310 of FIG. 3) that permits an increase in a temperature of the skin 408 of the device 400 above the default temperature (e.g., above the temperature associated with the first thermal constraint 304 of FIG. 3). In view of the permitted increase in the temperature of the skin 404, power to one or more hardware components of the device 400 and, thus performance of those component(s) can be increased.

Figure 6:
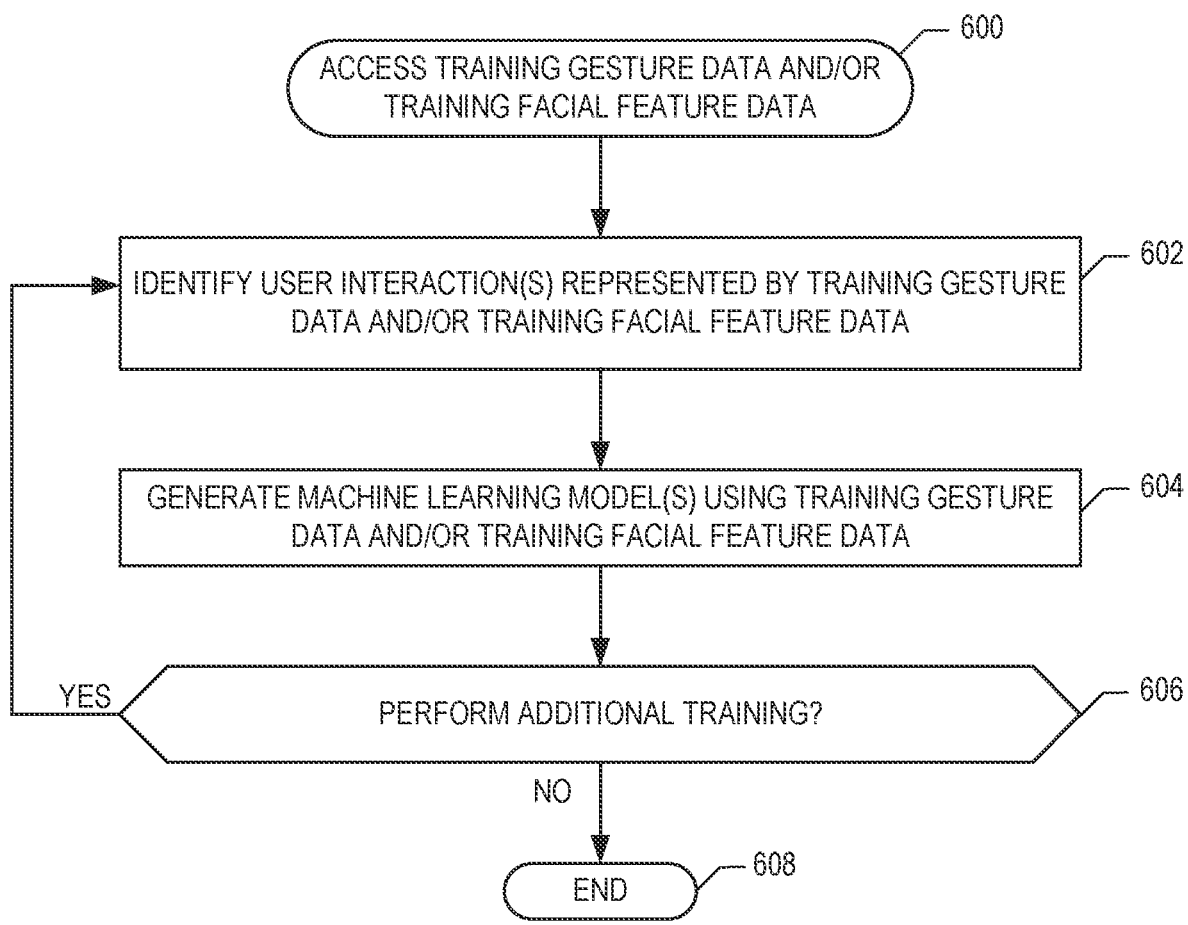
FIG. 6 is a flowchart representative of example machine readable instructions which may be executed to implement the example training manager of FIG. 2.

A flowchart representative of example hardware logic, machine readable instructions, hardware implemented state machines, and/or any combination thereof for implementing the example training manager 224 of FIG. 2 is shown in FIG. 6. The machine readable instructions may be one or more executable programs or portion(s) of an executable program for execution by a computer processor such as the processor 224 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 224, but the entire program and/or parts thereof could alternatively be executed by a device other than the processor 224 and/or embodied in firmware or dedicated hardware. Further, although the example program is described with reference to the flowchart illustrated in FIG. 6, many other methods of implementing the example training manager 224 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

FIG. 6 is a flowchart of example machine readable instructions that, when executed, implement the example training manager 224 of FIG. 2. In the example of FIG. 6, the training manager 224 trains the example thermal constraint manager 132 of FIGS. 1 and/or 2 using training gesture data and/or training facial feature data, which is generated for one or more users who may or may not be using the example user device 102 of FIG. 1. As discussed herein, the training manager 224 generates machine learning models that are used by the thermal constraint manager 132 of FIGS. 1 and/or 2 to select thermal constraint(s) for a temperature of a skin of the a user device (e.g., skin 408 of the housing 406 the user device 102, 400) and/or fan acoustic constraint(s) for noise generated by fan(s) of the user device (e.g., the fan(s) 114 of the user device 102) based on user interaction(s) relative to the user device 102.

The example instructions of FIG. 6 can be executed by one or more processors of, for instance, the user device 102, another user device (e.g., the user device 128), and/or a cloud-based device (e.g., the cloud-based device(s) 129). The instructions of FIG. 6 can be executed in substantially real-time as the training gesture data and/or the training facial feature data is received by the training manager 224 or at some time after the training data is received by the training manager 224. The training manager 224 can communicate with the thermal constraint manager 132 via one or more wired or wireless communication protocols.

The example trainer 226 of FIG. 2 accesses training gesture data 230 and/or training facial feature data 231 (block 600). The training gesture data 230 and/or training facial feature data 231 can be stored in the database 232. In some examples, the training gesture data 230 and/or training facial feature data 231 is generated for one or more users of the user device 102. In some examples, the training gesture data 230 and/or the training facial feature data 231 can be received from the thermal constraint manager 132 and/or directly from the image sensor(s) 122 and/or the motion sensor(s) 123 of the example user device 102, 400. In some other examples, the training gesture data 230 and/or the training facial feature data 231 is generated for users who are not the user(s) of the user device 102.

The example trainer 226 of FIG. 2 identifies user interactions (e.g., user interactions with the user device 102, 400 and/or other user interactions such as talking on a phone) represented by the training gesture data 230 and/or the training facial feature data 231 (block 602). As an example, based on the training gesture data 230, the trainer 226 identifies an arm motion in which a user reaches his or her arm forward as indicating that the user intends to touch a touch screen of a user device. As another example, based on the training facial feature data 231, the trainer 226 identifies eye positions indicating that a user is looking toward or away from a display screen of the device.

The example trainer 226 of FIG. 2 generates one or more gesture data model(s) 223 via the machine learning engine 228 and based on the training gesture data 230 and one or more facial feature data model(s) 225 via the machine learning engine 228 and based on the training facial feature data 231 (block 604). For example, the trainer 2226 uses the training gesture data 230 to generate the gesture data model(s) 223 that are used by the thermal constraint manager 132 to determine whether a user is typing on the keyboard 104, 404 of the user device 102, 400.

The example trainer 226 can continue to train the thermal constraint manager 132 using different datasets and/or datasets having different levels of specificity (block 606). For example, the trainer 226 can generate a first gesture data model 223 to determine if the user is interacting with the keyboard 104 of the user device 102, 400 and a second gesture data model 223 to determine if the user is interacting with the pointing device(s) 106 of the user device 102, 400. The example instructions end when there is no additional training to be performed (e.g., based on user input(s)) (block 608).

The example instructions of FIG. 6 can be used to perform training based on other types of sensor data. For example, the example instructions of FIG. 6 can be used to train the thermal constraint manager 132 to associate different orientations of the device 102, 400, screen angle, etc., with different user positions (e.g., sitting, standing) relative to the device 102, 400 and/or different locations of the device (e.g., resting a user's lap, held in a user's hand, resting on table).

Figure 7A:
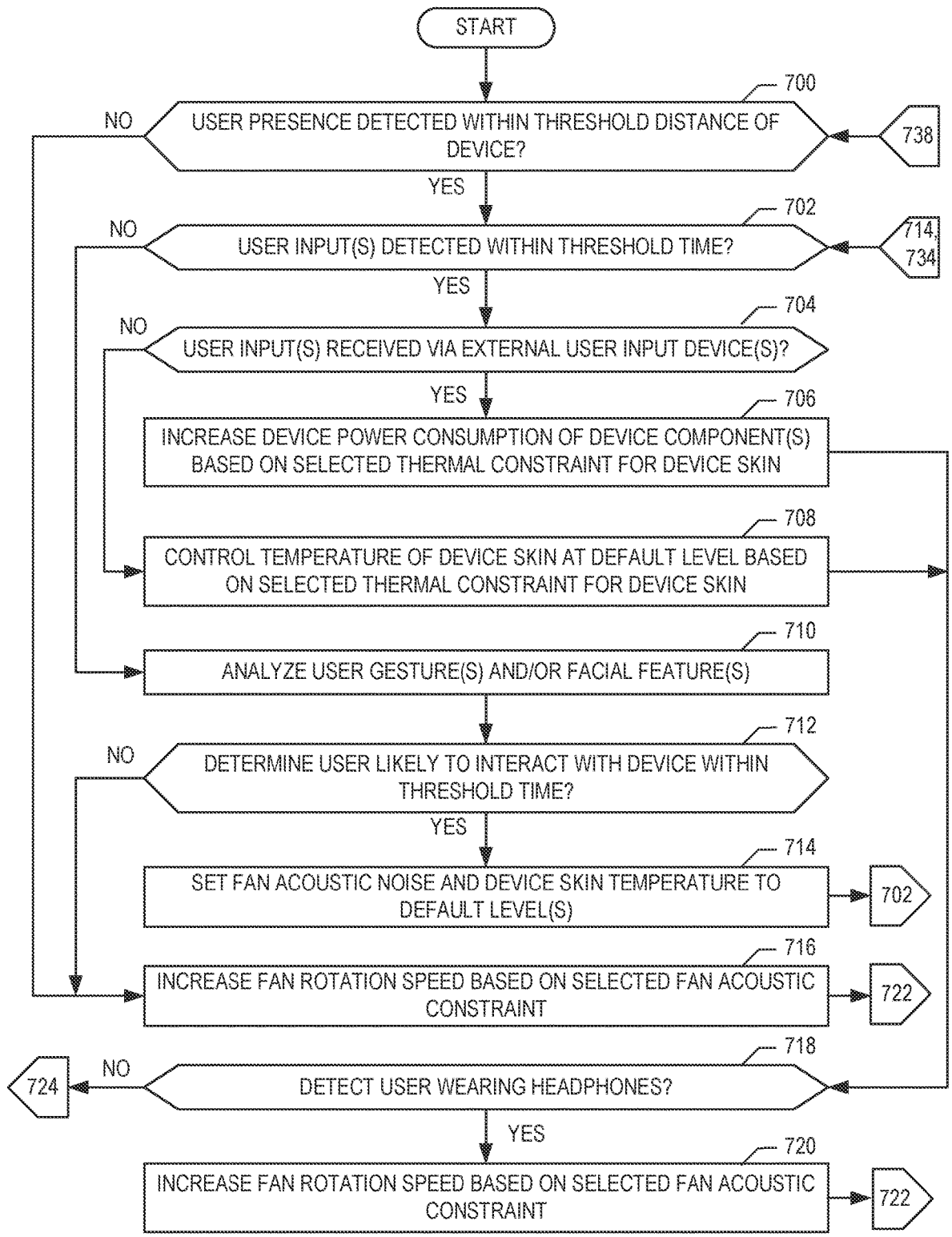
FIGS. 7A and 7B are flowcharts representative of example machine readable instructions which may be executed to implement the example thermal constraint manager of FIGS. 1 and/or 2.
Figure 7B:
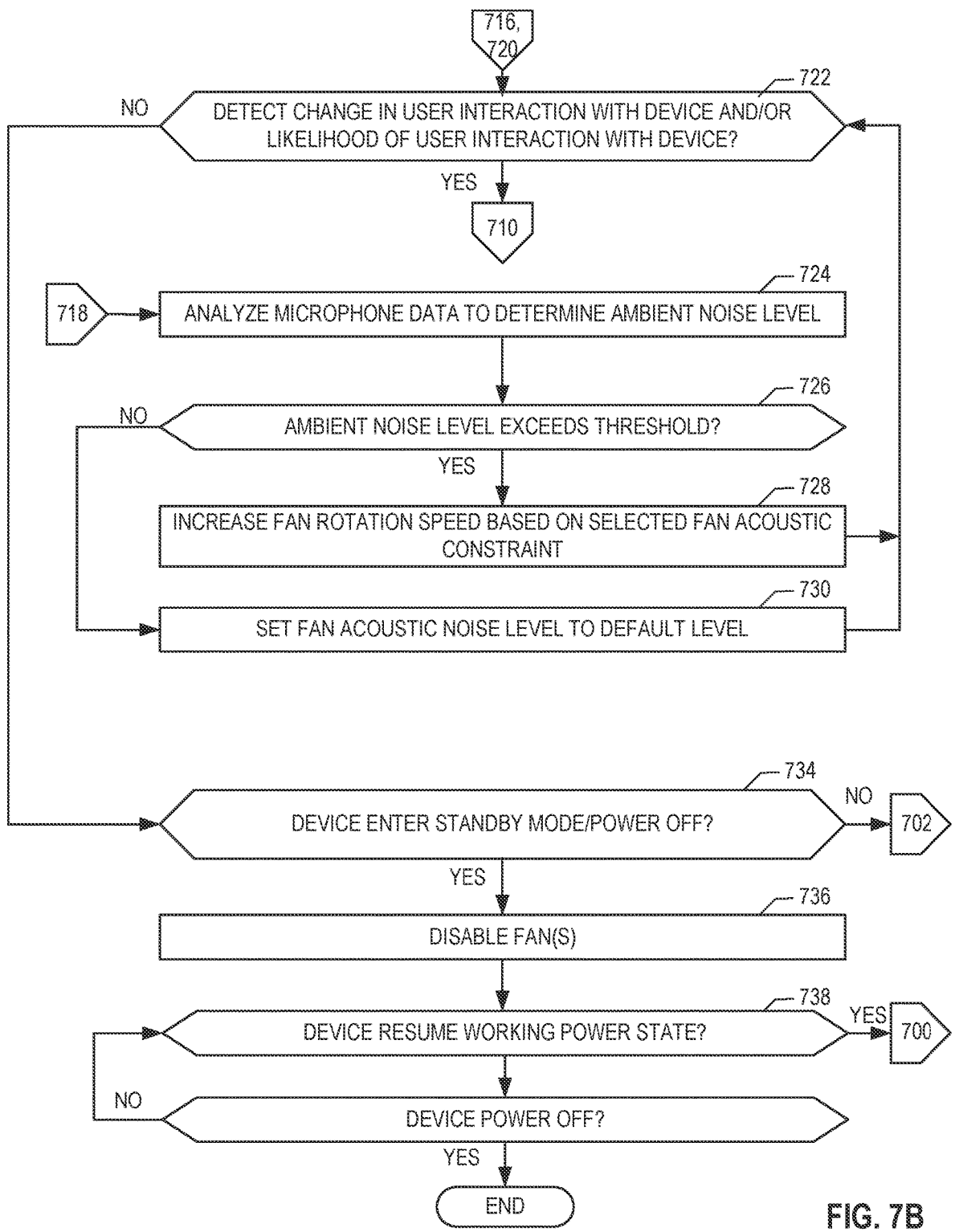

A flowchart representative of example hardware logic, machine readable instructions, hardware implemented state machines, and/or any combination thereof for implementing the thermal constraint manager 132 of FIG. 2 is shown in FIGS. 7A-7B. The machine readable instructions may be one or more executable programs or portion(s) of an executable program for execution by a computer processor such as the processor 132 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 132, but the entire program and/or parts thereof could alternatively be executed by a device other than the processor 132 and/or embodied in firmware or dedicated hardware. Further, although the example program is described with reference to the flowchart illustrated in FIGS. 7A-7B, many other methods of implementing the example thermal constraint manager 132 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

FIGS. 7A and 7B are flowcharts of example machine readable instructions that, when executed, implement the example thermal constraint manager 132 of FIGS. 1 and/or 2. In the example of FIGS. 7A and 7B, the thermal constraint manager 132 generates instruction(s) to control the thermal constraint(s) and/or fan acoustic constraint(s) of a user device (e.g., the user device 102, 400) based on a user interaction(s) and/or ambient condition(s) for an environment in which the device is located. The example instructions of FIGS. 7A and 7B can be executed by one or more processors of, for instance, the user device 102, 400 another user device (e.g., the user device 128), and/or a cloud-based device (e.g., the cloud-based device(s) 129). The instructions of FIGS. 7A and 7B can be executed in substantially real-time as sensor data received by the thermal constraint manager 132 or at some time after the sensor data is received by the thermal constraint manager 132.

In the example instructions of FIGS. 7A and 7B, the device 102, 400 can be in a working power state (e.g., a power state in which the device is fully operational in that the display screen is turned on, applications are being executed by processor(s) of the device) or a connected standby state (e.g., a low power standby state in which the device remains connected to the Internet such that processor(s) of the device can respond quickly to hardware and/or network events).

The example user presence detection analyzer 214 determines whether the user is within a threshold distance of the user device 102 (block 700). For example, the user presence detection analyzer 214 detects a user is approaching the user device 102, 400 based on data generated by the user presence detection sensor(s) 118 (e.g., TOF data, etc.) indicating that the user is within the range of the user presence detection sensor(s) 118. In some examples, the user presence detection analyzer 214 determines if the user is within a predefined distance of the device 102 (e.g., within 1 meter, within 0.5 meters, etc.).

In the example of FIGS. 7A and 7B, if the user presence detection analyzer 214 of the example thermal constraint manager 132 of FIG. 2 determines a user is detected within a threshold distance of the user device 102, the example device configuration analyzer 218 of the example thermal constraint manager 132 of FIG. 2 determines whether user input(s) are detected within a threshold time (block 702). For example, the timer 244 communicates with the device configuration analyzer 218 to determine the amount of time between which a user presence is detected within a threshold distance of the device 102, 400 (e.g., block 702) and when user input(s) are received by the device 102, 400. In some examples, the device configuration analyzer 218 detects user input(s) at the user device 102 such as keyboard input(s), touch screen input(s), mouse click(s), etc. If the device configuration analyzer 218 determines the user input(s) are detected within the threshold time, control proceeds to block 704.

At block 704, the device configuration analyzer 218 determines whether the user input(s) are received via external user input device(s) or on-board input device(s). For example, the device configuration analyzer 218 detects user input(s) via the external keyboard 108 and/or the external pointing device(s) 110 or via the on-board keyboard 104 and/or the on-board pointing device(s) 106.

If the device configuration analyzer 218 determines that the user input(s) are received via an external user input device, the thermal constraint selector 252 of the example thermal constraint manager 132 of FIG. 2 selects a thermal constraint for a temperature of the skin 408 of the device 102 (e.g., based on the thermal constraint selection rule(s) 254 stored in the database 212) that permits an increase in a temperature of a skin 408 of a housing 406 of the device 102, 400 relative to a default temperature. In response, the power source manager 238 of the example thermal constraint manager 132 of FIG. 2 instructs the hardware component(s) of the device 102, 400 (e.g., the processor 130) to consume increased amounts of power (block 706). For example, if the device configuration analyzer 218 determines that the user is interacting with the device 102, 400 via an external keyboard 104, 500, the thermal constraint selector 252 can select a thermal constraint that permits the skin temperature to increase to, for instance 47° C. from a default temperature of 45° C. The power source manager 238 communicates with the power source(s) 116 of the device 102, 400 to increase the power provided to the hardware component(s) of the user device 102, 400 based on the thermal constraint selected by the thermal constraint selector 252.

If the device configuration analyzer 218 determines that the user input(s) are being received by the device 102, 400 via on-board user input device(s) such as the on-board keyboard 104, the thermal constraint selector 252 of the example thermal constraint manager 132 of FIG. 2 selects a thermal constraint for a temperature of the skin 408 of the device 102 that maintains the temperature of the skin 408 of the housing 406 of the device 102, 400 at a default temperature and the power source manager 238 of the example thermal constraint manager 132 of FIG. 2 instructs the hardware component(s) of the device 102, 400 (e.g., the processor 130) to consume power so as not to cause the temperature of the skin to exceed the default temperature (block 708).

In some examples, in view of the thermal constraint(s) assigned to the device 102, 400 at blocks 706, 708, the temperature analyzer 236 monitors the temperature of the hardware component(s) of the user device 102 based on the data generated by the temperature sensor(s) 126 and the fan speed manager 240 controls operation of the fan(s) 114 (e.g., increase fan level to exhaust hot air to cool the user device 102) to prevent the skin temperature from exceeding the selected thermal constraint at blocks 706 and/or 708.

Control proceeds to block 718 from blocks 706, 708. At block 718, the device configuration analyzer 218 determines whether the user who is interacting with the device 102, 400 is wearing headphones 112. For example, the device configuration analyzer 218 detects whether headphones 112 are coupled with the user device 102 (e.g., via wired or wireless connection(s)) and audio output(s) are being provided via the device 102, 400. In some examples, the image data analyzer 220 determines whether the user is wearing headphones 112 based on image data generated by the image sensor(s) 122. If the device configuration analyzer 218 and/or the image data analyzer 220 determine the user is wearing headphones 112, the fan constraint selector 258 selects a fan acoustic constraint that permits the fan(s) 114 to rotate at increased speeds and, thus, generate more noise (e.g., 36 dBA) in view of the use of headphones 112 by the user and the fan speed manager 240 instructs the fan(s) to increase rotational speed(s) (block 720). If the device configuration analyzer 218 and/or the image data analyzer 220 determine the user is not wearing headphones, control proceeds to block 724.

At block 724, the ambient noise analyzer 234 analyzes microphone data generated by the microphone(s) 124 to determine an ambient noise level for an environment in which the user device 102, 400 is located. The ambient noise analyzer 234 determines whether the ambient noise level exceeds a threshold (e.g., based on the ambient noise rule(s) 235) (block 726). If the ambient noise level exceeds the threshold, the fan constraint selector 258 selects a fan acoustic constraint that permits the fan(s) 114 to rotate at increased speeds and, thus, generate more noise in view of the noisy surrounding environment and the fan speed manager 240 instructs the fan(s) to increase rotational speed(s) (block 728). If the ambient noise level does not exceed the threshold, the fan acoustic constraint selector 258 selects a default fan acoustic constraint (e.g., based on the fan acoustic constraint selection rule(s) 260) for the fan(s) 114 and the fan speed manager 240 of the example thermal constraint manager 132 of FIG. 1 instructs the fan(s) to rotate at speed(s) that generate noise at or under, for instance 35 dBA (block 730). Control returns to block 722.

In the examples of FIGS. 7A and 7B, if the device configuration analyzer 218 does not detect the user input(s) within a threshold time (block 702), the image data analyzer 220 and/or the motion data analyzer 222 analyze user gesture(s) (e.g., movements, posture) and/or facial feature(s) (e.g., eye gaze) based on data generated by the image sensor(s) 122 and/or the motion sensor(s) 123 (block 710). In some instances, the sensor manager 248 activates the image sensor(s) 122 to generate image data when the user is detected as being proximate to the device (block 700).

For example, the image data analyzer 220 analyzes image data generated by the image sensor(s) 122 to detect, for instance, a user's posture and/or eye gaze direction. Additionally or alternatively, the motion data analyzer 222 can analyze gesture data generated by the motion sensor(s) 123 to determine user gesture(s) (e.g., raising an arm, reaching a hand away from the user's body). In the example of FIGS. 7A and 7B, the image data analyzer 220 and/or the motion data analyzer 222 use machine-learning based model(s) 223, 225 to determine if a user is likely to interact with the user device 102. If the image data analyzer 220 and/or the motion data analyzer 222 determines that the user is likely to interact with the device 102, 400 within a threshold time as measured by the timer 244 (block 712), the fan acoustic constraint selector 258 selects a default fan acoustic constraint (e.g., based on the fan acoustic constraint selection rule(s) 260) for the fan(s) 114 of the device 102, 400 (block 714). Based on the default fan acoustic constraint, the fan speed manager 240 of the example thermal constraint manager 132 of FIG. 1 instructs the fan(s) to rotate at speed(s) that generate noise at or under, for instance 35 dBA. In some examples, at block 712, the thermal constraint selector 252 selects a default thermal constraint for the skin temperature of the device 102, 400 so the skin of the device 102, 400 does not exceed a temperature of, for instance, 45° C. in anticipation of the user interacting with the device. Thereafter, control returns to block 702 to detect if user input(s) have been received at the device 102, 400.

If the image data analyzer 220 and/or the motion data analyzer 222 determines the user is not likely to interact with the user device 102 within the threshold time, the fan constraint selector 258 selects a fan acoustic constraint that permits the fan(s) 114 to rotate at increased speeds and, thus, generate more noise to more efficiently cool the device 102, 400 (e.g., while the device 102, 400 is in a working power state) and/or to clean the fan(s) 114 (block 716). Also, if the user presence detection analyzer 214 does not detect the presence of a user within the range of sensor(s) 118 (block 700), the fan constraint selector 258 selects a fan acoustic constraint that permits the fan(s) 114 to rotate at increased speeds and, thus, generate more noise to more efficiently cool the device 102, 400 (e.g., while the device 102, 400 is in a working power state) and/or to clean the fan(s) 114. Control proceeds to block 722.

At block 722, one or more of the user presence detection analyzer 214, the device configuration analyzer 218, the image data analyzer 220, and/or the motion data analyzer 222 determines whether there is a change in user interaction with the user device 102 and/or a change in a likelihood that the user will interact with the user device 102 (block 722). For example, the user presence detection analyzer 214 can detect whether a user is no longer present based on the data generated by the user presence detection sensor(s) 118. In some other examples, the motion data analyzer 222 detects a user is reaching for the pointing device(s) 106 based on the data generated by the motion sensor(s) 123 and the gesture data model(s) 223 after a period of time in which the user was not interacting with the device 102, 400. If the one or more of the user presence detection analyzer 214, the device configuration analyzer 218, the image data analyzer 220, and/or the motion data analyzer 222 detect a change in user interaction with the user device 102 and/or a change in a likelihood of a user interaction with the user device 102, control returns to block 710 to analyzer user behavior relative to the device 102. If no change in user interaction with the device 102 and/or likelihood of user interaction is detected, control proceeds to block 734.

The example instructions of FIGS. 7A and 7B continue until the user device 102 enters a sleep mode (block 734), at which time the fan speed manager 240 disables the fan(s) 114 (block 736). If the device 102, 114 returns a working power state (or, in some examples, a connected standby state) (block 738), the example instructions of FIGS. 7A and 7B resume with detecting presence of the user proximate to the device 102, 400 (and moving component(s) such as the processor 130 and fan(s) 114 to higher power state) (block 700). The example instructions end when the device 102, 400 is powered off (blocks 740, 742).

The machine readable instructions described herein in connection with FIGS. 6 and/or 7A-7B may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6 and/or 7A-7B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 8:
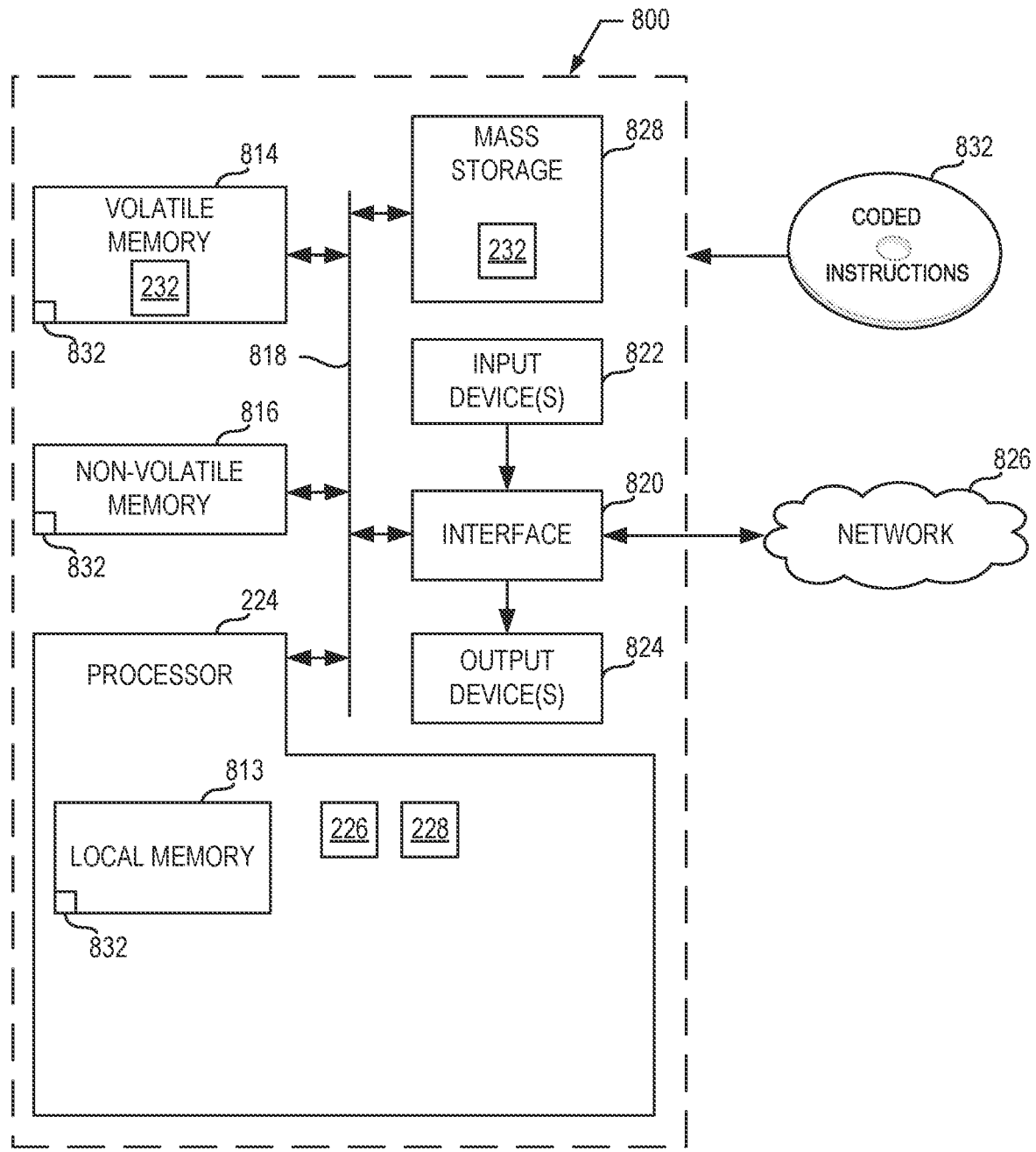
FIG. 8 is a block diagram of an example processing platform structured to execute the instructions of FIG. 6 to implement the example training manager of FIG. 2.

FIG. 8 is a block diagram of an example processor platform 800 structured to execute the instructions of FIG. 6 to implement the training manager 224 of FIG. 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 800 of the illustrated example includes a processor 224. The processor 224 of the illustrated example is hardware. For example, the processor 224 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example trainer 226 and the example machine learning engine 228.

The processor 224 of the illustrated example includes a local memory 813 (e.g., a cache). The processor 224 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 224. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 6 may be stored in the mass storage device 828, in the volatile memory 814, in the non-volatile memory 816, and/or on a removable non-transitory computer readable storage medium such as a CD or DVD.

Figure 9:
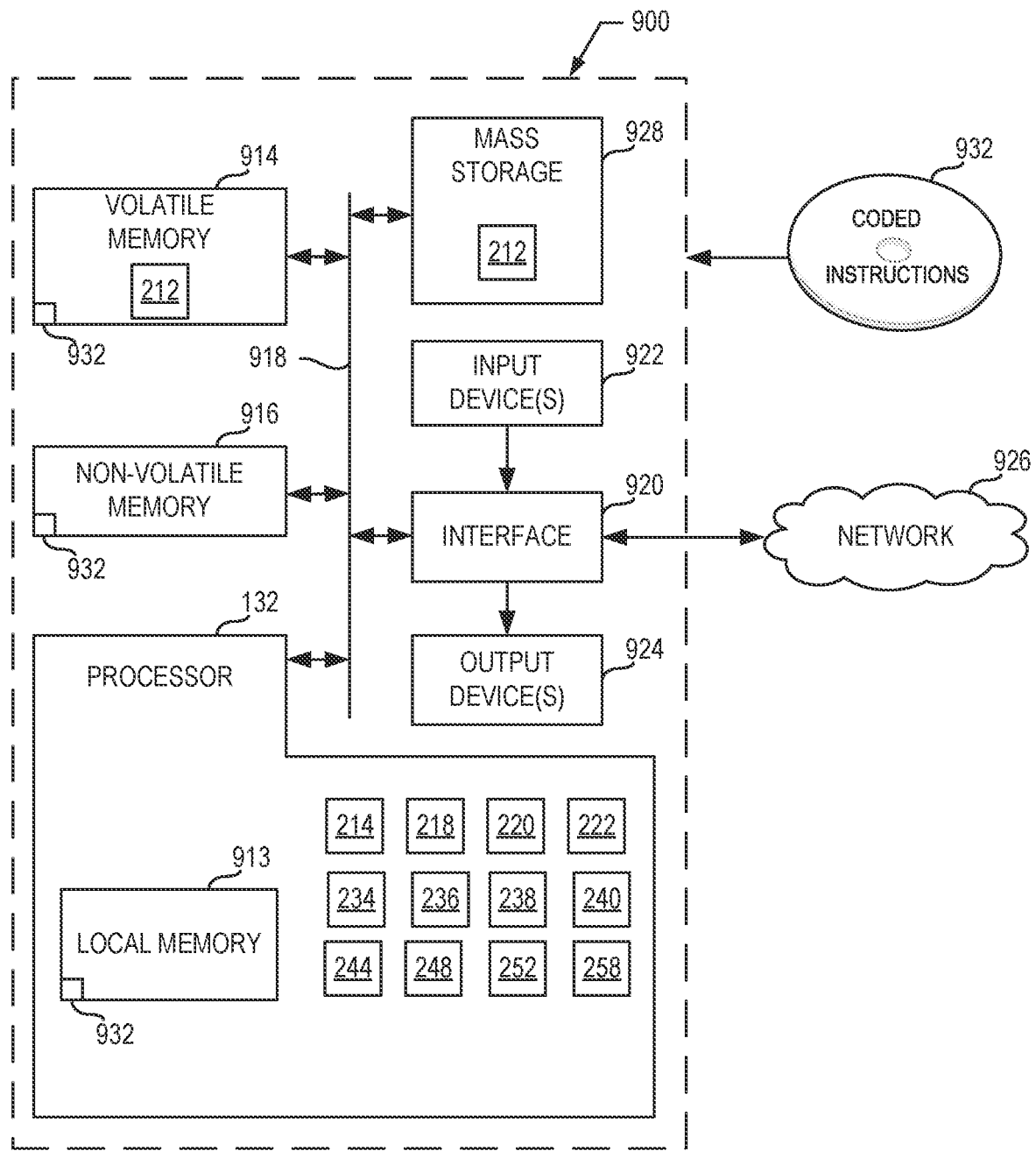
FIG. 9 is a block diagram of an example processing platform structured to execute the instructions of FIGS. 7A and 7B to implement the example thermal constraint manager of FIGS. 1 and/or 2.

FIG. 9 is a block diagram of an example processor platform 900 structured to execute the instructions of FIGS. 7A and 7B to implement the thermal constraint manager 132 of FIGS. 1 and/or 2. The processor platform 900 can be, for example, a server, a personal computer, a workstation, a self-learning machine (e.g., a neural network), a mobile device (e.g., a cell phone, a smart phone, a tablet such as an iPad™, a personal digital assistant (PDA), an Internet appliance, a headset or other wearable device, or any other type of computing device.

The processor platform 900 of the illustrated example includes a processor 132. The processor 132 of the illustrated example is hardware. For example, the processor 132 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example user presence detection analyzer 214, the example device configuration analyzer 218, the example image data analyzer 220, the example motion data analyzer 222, the example ambient noise analyzer 234, the example temperature analyzer 236, the example power source manager 238, the example fan speed manager 240, the example timer 244, the example sensor manager 248, the example thermal constraint selector 252, and the example fan acoustic constraint selector 258.

The processor 132 of the illustrated example includes a local memory 913 (e.g., a cache). The processor 132 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 132. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 7A and 7B may be stored in the mass storage device 928, in the volatile memory 814, in the non-volatile memory 916, and/or on a removable non-transitory computer readable storage medium such as a CD or DVD.

From the foregoing, it will be appreciated that example methods, apparatus and articles of manufacture have been disclosed that provide for dynamic control of thermal constraints and/or fan acoustic constraints of an electronic user device (e.g., a laptop, a tablet). Examples disclosed herein analyze sensor data indicative of, for instance, user interaction(s) with the device, other user activities (e.g., talking on a phone), and ambient noise to determine if a temperature of a skin of the device can be increased and/or if audible noises associated with rotation of the fan(s) of the device can be increased. Examples disclosed herein detect opportunities for increased skin temperature (e.g., when a user is interacting with the device via an external keyboard) and/or increased fan noise (e.g., when a user is located a threshold distance from the device or in a noisy environment). By permitting the skin temperature of the device to increase, example disclosed herein enable increased power to be provided to the hardware component(s) of the device and, thus, can improve performance (e.g., processing performance) of the device. By allowing the fan(s) to rotate at increased speed(s) and, thus, generate more noise, examples disclosed herein provide for efficient cooling of the device. The disclosed methods, apparatus and articles of manufacture improve the efficiency of using a computing device by selectively managing thermal constraint(s) for the device to optimize device performance and cooling in view user interactions with the device and/or ambient conditions. The disclosed methods, apparatus and articles of manufacture are accordingly directed to one or more improvement(s) in the functioning of a computer.

Example methods, apparatus, systems, and articles of manufacture to implement thermal management of electronic user devices are disclosed herein. Further examples and combinations thereof include the following:

Example 1 includes an electronic device including a housing, a fan, a first sensor, a second sensor, and a processor to at least one of analyze first sensor data generated by the first sensor to detect a presence of a subject proximate to the electronic device or analyze second sensor data generated by the second sensor to detect a gesture of the subject, and adjust one or more of an acoustic noise level generated the fan or a temperature of an exterior surface of the housing based on one or more of the presence of the subject or the gesture.

Example 2 includes the electronic device of example 1, wherein the second sensor includes a camera.

Example 3 includes the electronic device of examples 1 or 2, wherein the processor is to adjust the acoustic noise level by generating an instruction to increase a rotational speed of the fan.

Example 4 includes the electronic device of any of examples 1-3, wherein the processor is to adjust the temperature of the exterior surface of the device by controlling a power source of the device.

Example 5 includes the electronic device of any of examples 1-4, further including a microphone, the processor to analyze third sensor data generated by the microphone to detect ambient noise in an environment including the device, and adjust the acoustic noise level of the fan based on the ambient noise.

Example 6 includes the electronic device of example 1, further including a keyboard carried by the housing, wherein the processor is to detect an input via the keyboard and adjust the temperature of the exterior surface of the housing based on the detection of the input.

Example 7 includes the electronic device of example 1, further including a keyboard external to the housing, wherein the processor is to detect an input via the keyboard and adjust the temperature of the exterior surface of the housing based on the detection of the input.

Example 8 includes the electronic device of example 1, wherein the processor is to adjust one the acoustic noise level to during cleaning of the fan and based on the distance of the user being within a threshold distance from the electronic device.

Example 9 includes an apparatus including a user presence detection analyzer, an image data analyzer, a motion data analyzer, at least one of (a) the user presence detection analyzer to identify a presence of a user relative to an electronic device based on first sensor data generated by a first sensor of the electronic device or (b) at least one of the image data analyzer or the motion data analyzer to determine a gesture of the user relative to the device based on second sensor data generated by a second sensor of the electronic device, a thermal constraint selector to select a thermal constraint for a temperature of an exterior surface of the electronic device based on one or more of the presence of the user or the gesture, and a power source manager to adjust a power level for a processor of the electronic device based on the thermal constraint.

Example 10 includes the apparatus of example 9, further including a device configuration analyzer to detect a presence of an external user input device communicatively coupled to the electronic device.

Example 11 includes the apparatus of example 10, wherein the external device is at least one of a keyboard, a pointing device, or headphones.

Example 12 includes the apparatus of example 9, wherein the second sensor data is image data and the image data analyzer is to determine the gesture based on a machine learning model.

Example 13 includes the apparatus of examples 9 or 12, wherein the second sensor data is image data and wherein the image data analyzer is to detect a position of an eye of the user relative to a display screen of the electronic device.

Example 14 includes the apparatus of example 9, further including a fan acoustic constraint selector to select a fan acoustic constraint for a noise level to be generated by a fan of the electronic device during operation of the fan.

Example 15 includes the apparatus of example 14, further including an ambient noise analyzer to determine an ambient noise level based on ambient noise data generated by a microphone of the electronic device, the fan acoustic constraint selector to select the fan acoustic constraint based on the ambient noise level.

Example 16 includes the apparatus of example 14, wherein the user presence detection sensor is further to determine a distance of the user from the electronic device, the fan acoustic constraint selector to select the fan acoustic constraint based on the distance.

Example 17 includes the apparatus of example 14, wherein the fan acoustic constraint selector is to select the fan acoustic constraint for the noise level to be generated by the fan during cleaning of the fan.

Example 18 includes the apparatus of example 14, wherein the image data analyzer is to detect that the user is wearing headphones based on image data generated by the second sensor, the fan acoustic constraint selector to select the fan acoustic constraint based on the ambient noise level based on the detection of the headphones.

Example 19 includes at least one non-transitory computer readable storage medium including instructions that, when executed, cause a machine to at least identify one or more of (a) a presence of a user relative to an electronic device based on first sensor data generated by a first sensor of the electronic device, (b) a facial feature of the user based on second sensor data generated by a second sensor of the electronic device, or (c) a gesture of the user based on the second sensor data, select a thermal constraint for a temperature of an exterior surface of the electronic device based on one or more of the presence of the user, the facial feature, or the gesture, and adjust a power level for a processor of the electronic device based on the thermal constraint.

Example 20 includes the at least one non-transitory computer readable storage medium of example 19, wherein the instructions, when executed, further cause the machine to detect a presence of an external user input device communicatively coupled to the electronic device.

Example 21 includes the at least one non-transitory computer readable storage medium of example 19, wherein the instructions, when executed, further cause the machine to identify the gesture based on a machine learning model.

Example 22 includes the at least one non-transitory computer readable storage medium of examples 19 or 21, wherein the facial feature includes an eye position and wherein the instructions, when executed, further cause the machine to detect a position of an eye of the user relative to a display screen of the electronic device.

Example 23 includes the at least one non-transitory computer readable storage medium of examples 19 or 20, wherein the instructions, when executed, further cause the machine to select a fan acoustic constraint for a noise level to be generated by a fan of the electronic device during operation of the fan.

Example 24 includes the at least one non-transitory computer readable storage medium of example 23, wherein the instructions, when executed, further cause the machine to determine an ambient noise level based on ambient noise data generated by a microphone of the electronic device, the fan acoustic constraint selector to select the fan acoustic constraint based on the ambient noise level.

Example 25 includes the at least one non-transitory computer readable storage medium of example 23, wherein the instructions, when executed, further cause the machine to detect that the user is wearing headphones based on image data generated by the second sensor, the fan acoustic constraint selector to select the fan acoustic constraint based on the detection of the headphones.

Example 26 includes the at least one non-transitory computer readable storage medium of example 23, wherein the instructions, when executed, further cause the machine to determine a distance of the user from the electronic device and select the fan acoustic constraint based on the distance.

Example 27 includes the at least one non-transitory computer readable storage medium of example 23, wherein the instructions, when executed, further cause the machine to select the fan acoustic constraint for the noise level to be generated by the fan during cleaning of the fan.

Example 28 includes a method including at least one of (a) identifying a presence of a user relative to an electronic device based on first sensor data generated by a first sensor of the electronic device, (b) identifying a facial feature of the user based on second sensor data generated by a second sensor of the electronic device, or (c) identifying a gesture of the user based on the second sensor data, selecting a thermal constraint for a temperature of an exterior surface of the electronic device based on one or more of the presence of the user, the facial feature, or the gesture, and adjusting a power level for a processor of the electronic device based on the thermal constraint.

Example 29 includes the method of example 28, further including detecting a presence of an external user input device communicatively coupled to the electronic device.

Example 30 includes the method of example 28, further including determining the one or more of the facial feature or the gesture based on a machine learning model.

Example 31 includes the method of examples 28 or 30, wherein the facial feature includes eye position and further including detecting a position of an eye of the user relative to a display screen of the electronic device.

Example 32 includes the method of examples 28 or 29, further including selecting a fan acoustic constraint for a noise level to be generated by a fan of the electronic device.

Example 33 includes the method of example 32, further including determining an ambient noise level based on ambient noise data generated by a microphone of the electronic device, the fan acoustic constraint selector to select the fan acoustic constraint based on the ambient noise level.

Example 34 includes the method of example 32, further including detecting detect that the user is wearing headphones based on image data generated by the second sensor, the fan acoustic constraint selector to select the fan acoustic constraint based on the detection of the headphones.

Example 35 includes the method of example 32, further including determining a distance of the user from the electronic device and selecting the fan acoustic constraint based on the distance.

Example 36 includes the method of example 32, further including selecting the fan acoustic constraint for the noise level to be generated by the fan during cleaning of the fan.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An electronic device comprising:
a housing having an exterior surface;
a fan within the housing;
memory;
machine readable instructions; and
processor circuitry to execute the machine readable instructions to:
  initiate a timer after detection of a user within a defined distance of the electronic device based on first sensor data;
  after a user input is received at the electronic device, cause at least one of (a) a rotational parameter of the fan to be adjusted or (b) an operating parameter of hardware of the electronic device to be adjusted, the adjustment to the at least one of the rotational parameter or the operating parameter based on whether the user input was received at a user input device carried by the housing or at a user input device separate from the housing; and
  after the user input is not received at the electronic device within a first period of time, predict a likelihood of user interaction with the electronic device occurring within a second period of time based on second sensor data; and cause at least one of (a) the rotational parameter of the fan to be adjusted or (b) the operating parameter of the hardware to be adjusted based on the likelihood of the user interaction.

2. The electronic device of claim 1, wherein the operating parameter includes a power consumption level.

3. The electronic device of claim 1, wherein the processor circuitry is to cause the operating parameter of the hardware to be adjusted based on a first thermal constraint associated with the exterior surface of the housing.

4. The electronic device of claim 3, wherein the processor circuitry is to select the first thermal constraint relative to a second thermal constraint, the second thermal constraint defining a maximum surface temperature of the exterior surface of the housing.

5. The electronic device of claim 1, wherein the processor circuitry is to cause the rotational parameter of the fan to be adjusted based on a first thermal constraint associated with the exterior surface of the housing.

6. The electronic device of claim 1, wherein the second sensor data includes at least one of (a) image data from an image sensor or (b) motion data from a motion sensor.

7. The electronic device of claim 6, wherein the likelihood of user interaction is based on detection of a gesture of the user relative to the electronic device in the image data or the motion data.

8. The electronic device of claim 6 wherein the likelihood of user interaction is based on detection of a facial feature of the user relative to the electronic device in the image data.

9. The electronic device of claim 1, wherein the rotational parameter of the fan corresponds to at least one of (a) a rotational speed of the fan or (b) a rotational direction of the fan.

10. The electronic device of claim 9, wherein the processor circuitry is to:
detect a noise level of ambient noise in an environment in which the electronic device is located based on third sensor data; and
when the noise level exceeds a threshold value, at least one of (a) cause the rotational speed of the fan to increase or (b) cause the rotational direction of the fan to reverse.

11. The electronic device of claim 9, wherein the processor circuitry is to:
determine whether the user is wearing headphones based on third sensor data; and
when the user is wearing headphones, at least one of (a) cause the rotational speed of the fan to increase or (b) cause the rotational direction of the fan to reverse.

12. The electronic device of claim 1, wherein at least one of (a) after the user input was received at the user input device carried by the housing, the processor circuitry is to adjust the operating parameter of the hardware to a first power consumption level, or (b) after the user input was received at the user input device separate from the housing, the processor circuitry is to adjust the operating parameter of the hardware to a second power consumption level, the second power consumption level greater than the first power consumption level.

13. At least one non-transitory computer readable medium comprising instructions that, when executed, cause processor circuitry to at least:
initiate a timer after detection of a presence of a user within a predefined distance relative to an electronic device based on signals output by a first sensor;
after a user input is received at the electronic device within a first duration of time, cause at least one of (a) a rotational parameter of a fan to be adjusted or (b) an operating parameter of hardware of the electronic device to be adjusted, the adjustment to the at least one of the rotational parameter or the operating parameter based on whether the user input was received at a user input device carried by the electronic device or at a user input device external from the electronic device; and
after the user input is not received at the electronic device within the first duration of time, predict, based on signals output by a second sensor, a likelihood of a user interaction with the electronic device within a second duration of time; and adjust at least one of (a) the rotational parameter of the fan and (b) the operating parameter of the hardware based on the prediction.

14. The at least one non-transitory computer readable medium of claim 13, wherein the operating parameter includes a level of power consumed by the hardware.

15. The at least one non-transitory computer readable medium of claim 13, wherein the second sensor includes an image sensor and the instructions, when executed, cause the processor circuitry to:
detect, based on image data generated by the image sensor, a gesture by the user; and
predict the likelihood of the user interaction based on the gesture.

16. The at least one non-transitory computer readable medium of claim 13, wherein the second sensor includes an image sensor and the instructions, when executed, cause the processor circuitry to:
detect an eye of the user in image data generated by the image sensor; and
predict the likelihood of the user interaction based on the detection of the eye.

17. The at least one non-transitory computer readable medium of claim 13, wherein the rotational parameter of the fan corresponds to at least one of (a) a rotational speed of the fan and (b) a rotational direction of the fan.

18. An electronic device comprising:
means for cooling hardware in the electronic device;
means for detecting a presence of a user relative to the electronic device, the presence detecting means to detect the presence of the user within a defined distance of the electronic device;
means for monitoring a duration of time from the detection of the user;
means for analyzing presence to, in response to the detection of the presence of the user by the presence detecting means, determine if a user input was received at the electronic device within a first amount of time;
means for analyzing device configuration to, when the user input was received at the electronic device within the first amount of time, determine if the user input was received at (a) a user input device carried by the electronic device or (b) a user input device external from the electronic device; and
means for analyzing motion to, when the user input is not received at the electronic device within the first amount of time,
predict a likelihood of user interaction with the electronic device occurring within a second amount of time based on a gesture, the second amount of time later than the first amount of time measured by the monitoring means; and
means for controlling the cooling means, the controlling means to cause a parameter of the cooling means to be adjusted based on (a) whether the user input was received at the user input device carried by the electronic device or at the user input device separate from the electronic device when the user input is received at the electronic device within the first amount of time or (b) the likelihood of the user interaction.

19. The electronic device of claim 18, wherein the parameter of the cooling means corresponds to rotational speed of the cooling means.

20. The electronic device of claim 18, further including a display screen, where the analyzing means is to:
detect the gesture as occurring proximate to the display screen; and
predict the likelihood of the user interaction based on the detection of the gesture relative to the display screen.

* * * * *